United States Patent [19]

Hori

[11] Patent Number: 5,644,560

[45] Date of Patent: Jul. 1, 1997

[54] THREE-BEAM DETECTING SYSTEM PHASE DIFFERENCE DETECTOR WHICH ELIMINATES PHASE DIFFERENCE ERROR

[75] Inventor: Koji Hori, Kanagawa, Japan

[73] Assignee: Sony Corporation, Tokyo, Japan

[21] Appl. No.: 459,353

[22] Filed: Jun. 2, 1995

Related U.S. Application Data

[62] Division of Ser. No. 995,593, Dec. 22, 1992.

[30] Foreign Application Priority Data

Dec. 26, 1991 [JP] Japan ................................. 3-344498
Jan. 8, 1992 [JP] Japan ................................. 4-001699

[51] Int. Cl.⁶ ................................................. G11B 7/095
[52] U.S. Cl. .............................. 369/44.34; 369/44.35; 369/44.37
[58] Field of Search ........................... 369/44.34, 44.35, 369/44.37, 44.41, 44.25; 360/77.06

[56] References Cited

U.S. PATENT DOCUMENTS

| | | | |
|---|---|---|---|
| 4,712,206 | 12/1987 | Kanda ................................. | 369/44.37 |
| 4,843,602 | 6/1989 | McGee ................................ | 369/44.34 |
| 5,258,968 | 11/1993 | Matsuda et al. ................... | 369/44.34 |

FOREIGN PATENT DOCUMENTS 0256743  2/1990  Japan .

Primary Examiner—Aristotelis M. Psitos
Assistant Examiner—Alan Faber
Attorney, Agent, or Firm—Limbach & Limbach L.L.P.

[57] ABSTRACT

In order that a measurement error of a phase difference based on an eccentricity produced when an optical disc is inserted into a disc spindle and rotated can be eliminated to improve a measurement accuracy, a polarity adding circuit is provided between an exclusive-OR circuit for detecting an absolute value of a phase difference and a low-pass filter to determine the polarity to thereby eliminate a measurement error in the vicinity of a portion where a phase difference is zero.

11 Claims, 16 Drawing Sheets

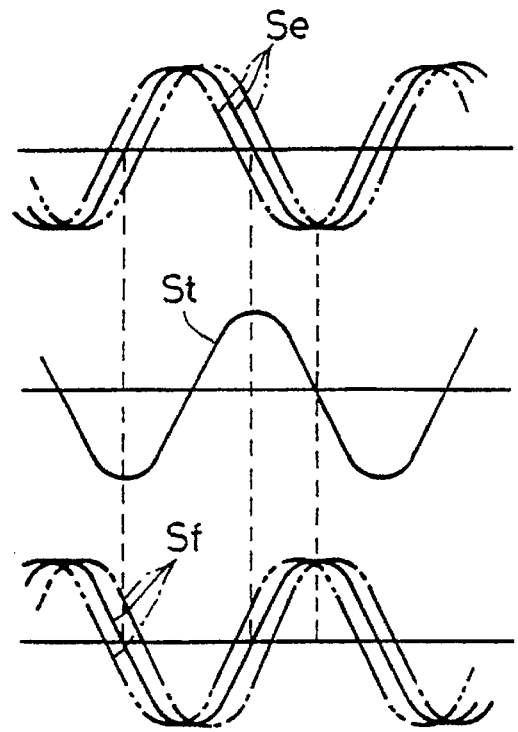
FIG. 4A (PRIOR ART)
FIG. 4B (PRIOR ART)
FIG. 4C (PRIOR ART)
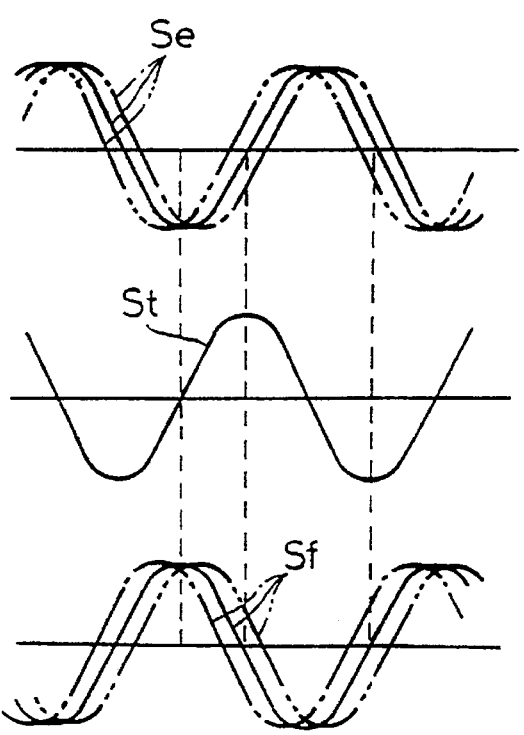
FIG. 5A (PRIOR ART)
FIG. 5B (PRIOR ART)
FIG. 5C (PRIOR ART)

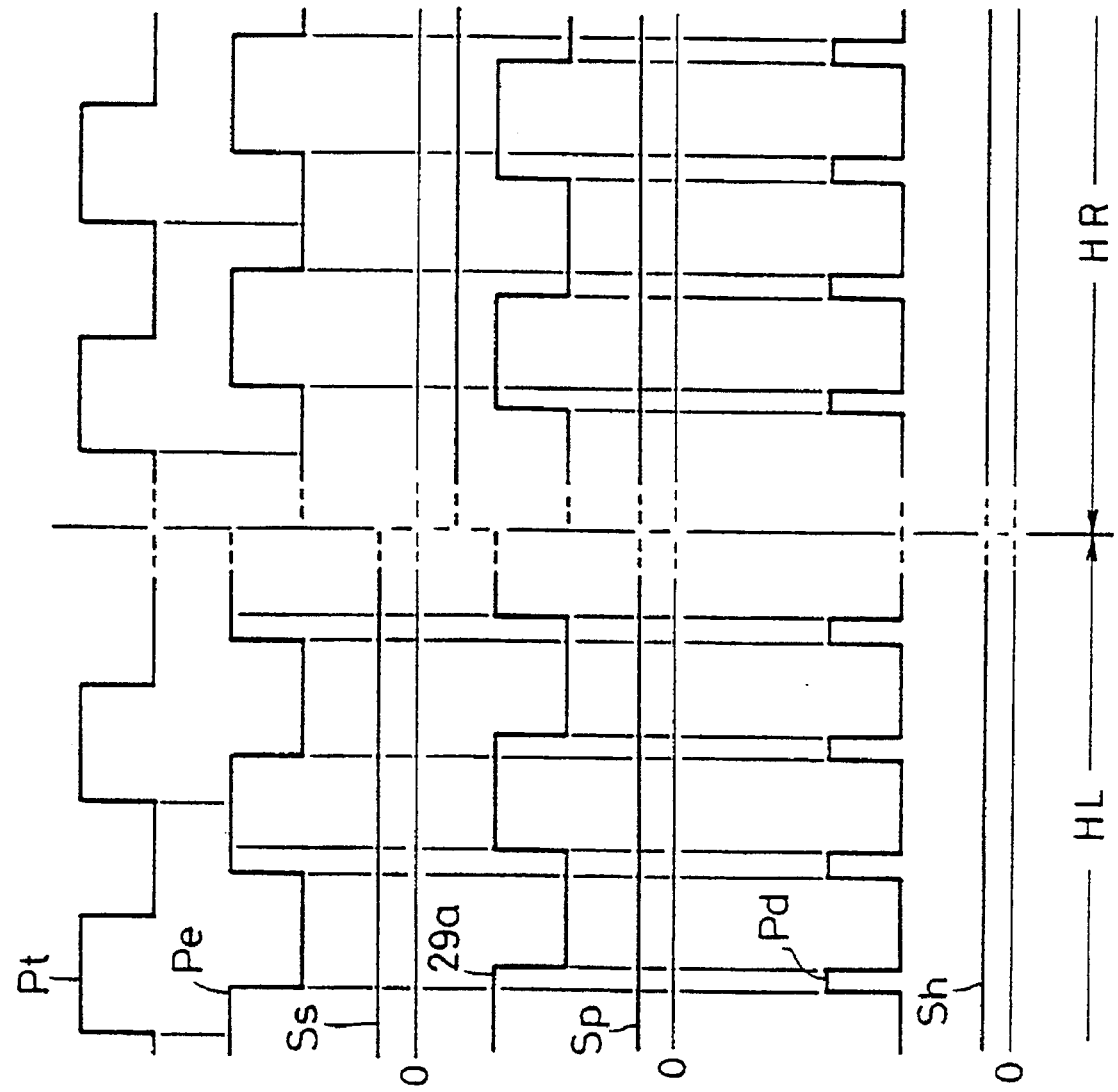

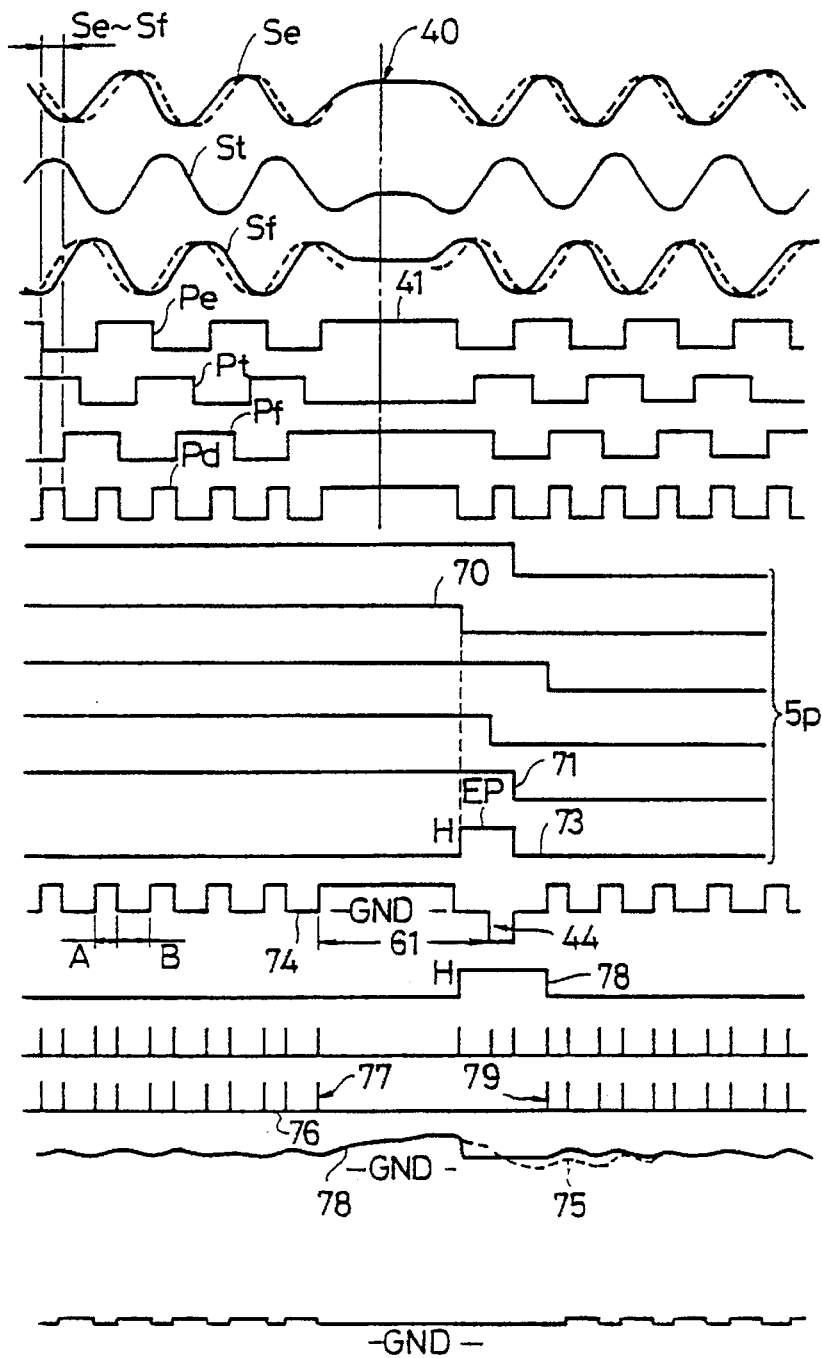

FIG. 19A Pe
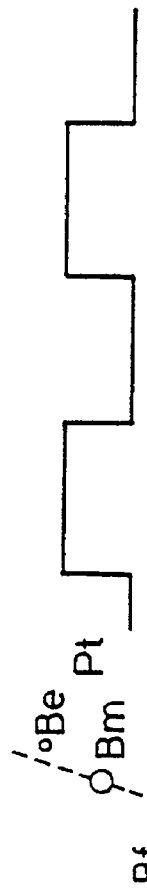
FIG. 19B Bf° ○Be ○Bm Pt
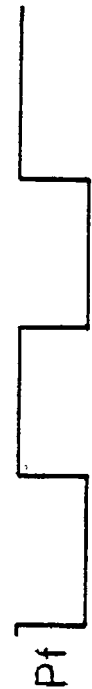
FIG. 19C Pf ⌐L Track Rows
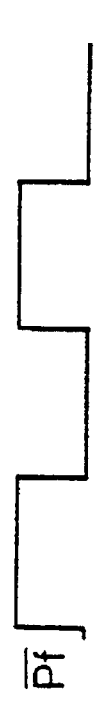
FIG. 19D $\overline{Pf}$
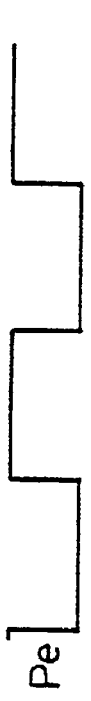
FIG. 19E Pe
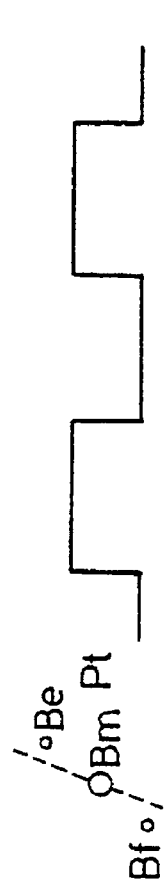
FIG. 19F Bf° ○Be ○Bm Pt
FIG. 19G Pf →R Track Rows
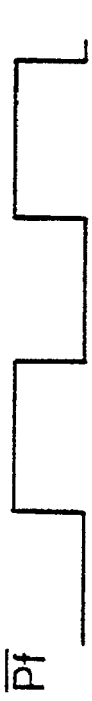
FIG. 19H $\overline{Pf}$

THREE-BEAM DETECTING SYSTEM PHASE DIFFERENCE DETECTOR WHICH ELIMINATES PHASE DIFFERENCE ERROR

This is a divisional of application Ser. No. 07/995,593, filed Dec. 22, 1992.

BACKGROUND OF THE INVENTION

1. Field of the Invention

The present invention generally relates to a phase difference detecting apparatus for detecting a phase difference state obtained from a side beam of a three-beam system and, more particularly, to a phase difference detecting apparatus which can eliminate a phase difference error produced when a track that is swingable with respect to the direction perpendicular to the side beam is inverted.

2. Description of the Prior Art

FIG. 1 of the accompanying drawings shows a structure of an optical head in which a laser beam is radiated onto recording pits on an optical disc from the optical head to thereby effect a tracking control and a focusing control. The optical head shown in FIG. 1 generally comprises one optical system block 10. The optical head can be moved along a radial direction (direction shown by an arrow A in FIG. 1) of an optical disc D on which there are formed spiral recording tracks. Within the optical block 10, a laser beam emitted from a laser diode 1 serving as a laser beam generating source is passed through a grating 2 and then introduced into a polarizing beam splitter 3. The laser beam passed through an analyzer surface 3a of the polarizing beam splitter 3 is introduced into a collimator lens 4, in which it is collimated to provide a collimated laser beam. Then, the collimated laser beam is passed through a quarter-wave plate 5 and introduced into an objective lens 6. Thus, the laser beam is converged on the optical disc D by the objective lens 6. The laser light beam introduced into the optical disc D is modulated and reflected on the recording tracks formed on the optical disc D and then converted into a reflected laser light beam.

The reflected laser light beam from the optical disc D is returned through the objective lens 6, collimated and then passed through the quarter-wave plate 5. The reflected laser light beam, which is reflected on the optical disc D and passed again through the quarter-wave plate 5, is rotated by π/2 in polarizing direction with respect to the laser light beam which is passed through the polarizing beam splitter 3 and focussed onto the optical disc D.

The reflected laser beam whose polarizing direction is rotated by π/2 is introduced into the collimator lens 4, in which it is converted into a converged laser light beam and then introduced into the polarizing beam splitter 3. Then, this laser light beam is reflected onto the analyzer surface 3a of the beam splitter 3 and then introduced through a sensor lens 7 to a photo-sensor unit 8. Then, the photo-sensor unit 8 detects the reflected laser beam modulated by the recording tracks formed on the optical disc D and outputs the change of the reflected laser beam as a signal.

The objective lens 6 includes a focusing control coil 9F which effects the focusing control by controlling the objective lens 6 to come closer or to come away from the optical disc D along the optical axis direction and a tracking control coil 9T which controls the objective lens 6 to move in the radial direction of the optical disc D, i.e., in the direction perpendicular to the optical axis of the objective lens 6.

In the above optical system block 10, the laser beam from the laser diode 1 is processed by the grating 2 to provide three laser light beams. Although the three laser light beams are shown as a single laser light beam in FIG. 1, in the light path succeeding to the grating 2 wherein the laser beam is reflected on the optical disc D, refracted by the polarizing beam splitter 3 and then introduced into the photo-sensor unit 8, there exist three laser beams in actual practice. The above three laser beams are introduced as a main beam which is used to read out an information which is recorded on the optical disc D at its recording track under the tracking control and two side beams located at both sides of the main beam so as to detect a tracking error of the main beam relative to the recording track.

The main beam and the two side beams are introduced into the optical disc D as follows. As shown in FIG. 2 of the accompanying drawings, under the proper tracking condition, a beam spot Bm of the main beam is formed such that its center becomes coincident with a center position of a recording track T. Also, beam spots Be and Bf of the two side beams are formed at symmetrical positions with respect to the direction extended along the recording track T and perpendicular to the recording track T about the beam spot Bm of the main beam so that they are partly overlapped on the recording tracks T.

The main beam and two side beams reflected on the optical disc D are supplied through cylindrical lenses forming a common sensor lens to a separated photo-detector provided in the photo-sensor unit 8.

As shown in FIG. 3 of the accompanying drawings, the photo-sensor unit 8 comprises a main beam photo-detector 11 composed of adjacent quadrant photo-detecting elements 11a, 11b, 11c and 11d and two side beam photo-detectors 12e and 12f spaced apart from these photo-detecting elements 11a, 11b, 11c and 11d. The main beam from the optical disc D is detected by the main beam photo-detector 11 and the two side beams from the optical disc D are detected by the side beam photodetectors 12e, 12f, respectively.

Detecting outputs Sa, Sb, Sc and Sd are generated from the photo-detecting elements 11a through 11d forming the main beam photo-detector 11 and then added by an adding unit 13. Therefore, the adding unit 13 derives a main beam detecting signal St corresponding to the main beam from the optical disc D. This main beam detecting signal St is used to form a focusing error signal. The side beam photo-detectors 12e and 12f derive side beam detecting signals Se and Sf corresponding to the respective two side beams. These side beam detecting signals Se and Sf are used to form a tracking error signal.

The main beam and two side beams introduced into the optical disc D are placed properly so that the beam spot location relationship shown in FIG. 2 is achieved under the proper tracking condition. Further, the main beam and two side beams reflected on the optical disc D have considerably different reflection intensity either when the reflected position is located on the pits on the optical disc D, i.e., the portion in which the recording track T is formed or when it is located between the recording tracks T.

When the recording track T is moved in the arrow L or R direction in FIG. 2 with respect to the main beam and two side beams, the main beam and two side beams respectively cross a plurality of recording tracks T relatively, whereby the main beam detecting signal St and the side beam detecting signals Se, Sf are respectively fluctuated in level at cycles corresponding to the spacing between the recording tracks T and the moving speed of the recording track T.

When the recording track T is moved in the arrow L direction with respect to the main beam and two side beams, the main beam detecting signal St presents a level fluctuation shown in FIG. 4B and the side beam detecting signal Se presents a level fluctuation which is advanced in phase by 90° from the main beam detecting signal St as shown by a solid line in FIG. 4A. The side beam detecting signal Sf has a level fluctuation whose phase is delayed by 90° from the main beam detecting signal St as shown in FIG. 4C.

When the recording track T is moved in the arrow R direction (FIG. 2) relative to the main beam and the two side beams, if the main beam detecting signal St has a level fluctuation (the same as that shown in FIG. 4B) shown in FIG. 5B, the side beam detecting signal Se has a level fluctuation whose phase is delayed by 90° from the main beam detecting signal St as shown by a solid line in FIG. 5A. The side beam detecting signal Sf has a level fluctuation whose phase is advanced by 90° from the main beam detecting signal St as shown by a solid line in FIG. 5C.

In the state such that the positions of the main beam and the two side beams are properly set relative to the optical disc D, when the recording track T is moved in the arrow L or R direction in FIG. 2 relative to the main beam and the two side beams, the side beam detecting signal Se and the side beam detecting signal Sf produce level fluctuations having a phase difference of 180° therebetween.

The positions of the main beam and the two side beams relative to the optical disc D are set by adjusting a rotational angle of the grating 2, for example, under the condition such that the optical block 10 is attached to a predetermined position. If there is no error in attaching the optical system block 10 or error in adjusting the rotational angle of the grating 2, for example, the positional relation between the beam spot Bm of the main beam and the beam spots Be and Bf of the two side beams are set in proper states shown by solid lines in FIG. 6 under the condition such that the optical disc D is set in the proper tracking condition. However, as shown by one-dot chain lines in FIG. 6, it may be that due to error, the beam spots Be and Bf of the two side beams are displaced toward the outside of the recording track T as Be$_1$ and Bf$_1$ from the proper positions. This state will hereinafter be referred to as "opened state". Alternatively, as shown by two-dot chain lines in FIG, 6, the positions of the beam spots Be and Bf of the two side beams may respectively, be erroneously displaced toward the inside of the recording track T as Be$_2$ and Bf$_2$ from the proper states. This state will hereinafter be referred to as "closed state" Consequently, it is frequently observed that the positions of the main beam and the two side beams relative to the optical disc D are not set correctly.

When the beam spot Bm formed by the main beam and the beam spots Be and Bf formed by the two side beams are set in "opened state", if the recording track T is moved in the arrow L direction in FIG. 2 relative to the main beam and the two side beams, then the side beam detecting signal Se has a level fluctuation whose phase is advanced as compared with the level fluctuation of the proper state as shown by a one-dot chain line in FIG. 4A. On the other hand, the side beam Sf has a level fluctuation whose phase is delayed as compared with the level fluctuation of the proper state as shown by a one-dot chain line in FIG. 4C.

If the recording track T is moved in the arrow R direction in FIG. 2 relative to the main beam and the two side beams, the side beam detecting signal Se has a level fluctuation whose phase is delayed as compared with the level fluctuation of the proper state as shown by a one-dot chain line in FIG. 5A. On the other hand, the side beam detecting signal Sf has a level fluctuation whose phase is advanced as compared with the level fluctuation of the proper state as shown by a one-dot chain line in FIG. 5C.

When the positional relationship between the beam spot Bm of the main beam and the beam spots Be, Bf of the two side beams is set in "closed state", if the recording track T is moved in the arrow L direction in FIG. 2 relative to the main beam and the two side beams, the side beam detecting signal Se has a level fluctuation whose phase is delayed as compared with the level fluctuation of the proper state as shown by a two-dot chain line in FIG. 4A. On the other hand, the side beam detecting signal Sf has a level fluctuation whose phase is advanced as compared with the level fluctuation of the proper state as shown by a two-dot chain line in FIG. 4C.

If the recording track T is moved in the arrow R direction in FIG. 2 relative to the main beam and the two side beams, then the side beam detecting signal Se has a level fluctuation whose phase is advanced as compared with the level fluctuation of the proper state as shown by a two-dot chain line in FIG. 5A. On the other hand, the side beam detecting signal Sf has a level fluctuation whose phase is delayed as compared with the level fluctuation of the proper state as shown by a two-dot chain line in FIG. 5C.

As described above, with respect to the optical system block 10, it is determined whether the positional relationship between the beam spot Bm of the main beam and the beam spots Be, Bf of the two side beams in the optical disc D is set in "proper state", "opened state" or "closed state". Further, if it is set in "opened state" or "closed state", the degree of the "opened state" or "closed state" must be detected. These are requirements in order to correct the position of the main beam and the two side beams relative to the optical disc d and to effect the setting for the tracking control.

During the above detection, the recording track T is moved in the direction shown by the arrow L or R in FIG. 2 due to eccentricity caused when the optical disc D is rotated under the condition such that the tracking control is not effected. Under this condition, the phase difference between the side beam detecting signal Se and the side beam detecting signal Sf is calculated.

However, the recording track T is swung relative to the main beam and the two side beams due to the eccentricity of the rotating optical disc D. Therefore, the swinging direction of the recording track T relative to the main beam and the two side beams is changed from the arrow L direction to the arrow R direction in FIG. 2 or vice versa at every half-rotation cycle of the optical disc D. Consequently, on the basis of the phase difference between the side beam detecting signal Se and the side beam detecting signal Sf, it can be determined whether the positional relationship between the beam spot Bm of the main beam and the beam spots Be and Bf of the two side beams is set in "proper state", "opened state" or "closed state". Also, the degree of the "opened state" or the "closed state" can be detected. However, it cannot be detected whether the side beam detecting signals Se and Sf are delayed or advanced in phase. Accordingly, it cannot be determined whether the positional relationship between the beam spot Bm of the main beam and the beam spots Be, Bf of the two side beams is set in the "opened state" or the "closed state".

The assignee of the present application has previously proposed a phase difference detecting apparatus which can adequately determine whether the positional relationship between the beam spot of the main beam and the beam spots of the two side beams is set in the "proper state", the "opened state" or the "closed state" and which can also detect the degree of the "opened state" or the "closed state" (see Japanese Laid-Open Patent Publication No. 2-56743).

FIG. 7 of the accompanying drawings is a block diagram showing a circuit arrangement of the previously-proposed phase difference detecting apparatus (Japanese Laid-Open Patent Publication No. 2-56743). In FIG. 7, the elements and parts within the photo-sensor unit 8 are marked with the same references in FIG. 3 and therefore need not be described in detail.

Under the proper tracking state, the main beam and the two side beams are introduced from the optical system block 10 into the optical disc D such that the beam spot Bm of the main beam and the beam spots Be, Bf of the two side beams are formed on the optical disc D as shown in FIG. 2.

As shown in FIG. 7, the main beam detecting signal St from the adding unit 13 in the photo-sensor unit 8, the side beam detecting signal Se from the side beam photo-detecting unit 12e, and the side beam detecting signal Sf from the side beam photo-detecting unit 12f are respectively supplied to comparing input terminals of level comparators 21, 22 and 23. Reference input terminals of these level comparators 21, 22 and 23 are respectively held at ground potentials. The level comparators derive waveform-shaped output signals Pt, Pe and Pf, respectively.

The waveform-shaped output signals Pt and Pe from the level comparators 21 and 22 are respectively supplied to a clock terminal C and a data terminal D of a D-type flip-flop (D-FF) 24. The D-type flip-flop 24 forms a phase comparing unit which determines whether the phase of the waveform-shaped output signal Pe is advanced or delayed from the phase of the waveform-shaped output signal Pt. A compared output signal Ss is output from an output terminal Q of the D-type flip-flop 24 and then supplied to a control terminal of a switching unit 25 which incorporates therein switches 25a, 25b, 25c and 25d, each of which is operated in a ganged fashion.

The waveform-shaped output signal Pe from the level comparator 22 is supplied through the switches 25a and 25b of the switching unit 25 to a data terminal D and a clock terminal C of a D-type flip-flop 26 and is also supplied to one input terminal of an exclusive-OR circuit (EX-OR) 27. The D-type flip-flop 26 forms a phase comparing unit which detects a mutual phase relationship between the waveform-shaped output signals Pe and Pf. A compared output signal Sp is output from an output terminal Q of the D-type flip-flop 26 and then delivered to an output terminal 28.

The waveform-shaped output signal Pf from the level comparator 23 is supplied to and inverted by an inverter 29 as a polarity inverted waveform-shaped output signal 29a. This output signal 29a is supplied through the switches 25c and 25d of the switching unit 25 to the clock terminal C and the data terminal D of the D-type flip-flop 26 and is also supplied to the other input terminal of the exclusive-OR circuit 27. A pulse output signal Pd is output from the exclusive-OR circuit 27 and supplied to a low-pass filter (LPF) 30 whose output signal Sh is delivered to an output terminal 31.

Due to the eccentricity in the spindle diameter and the central aperture diameter when the central aperture of the disc D is inserted into the spindle of a turntable and the disc D is rotated under the condition that the tracking is not effected, there are obtained the main beam detecting signal St and the side beam detecting signals Se and Sf. When the beam spots Bm and the side beam spots Be, Bf of the main and side beams are set in the "opened state" as the beam spots $Be_1$ and $Bf_1$ as shown by the one-dot chain line in FIG. 6, during a half-rotation period HL where the recording track T is moved in the arrow L direction in FIG. 2 relative to the main beam and the two side beams during each rotation period of the rotating optical disc D and during the next half-rotation period HR where the recording track T is moved in the arrow R direction in FIG. 2, the waveform-shaped output signal Pt obtained from the level comparator 21 based on the main beam detecting signal St becomes a square wave waveform-shaped output signal Pt whose waveform is shown in FIG. 8A.

The waveform-shaped output signal Pe obtained from the level comparator 22 based on the side beam detecting signal Se becomes a square wave signal whose phase is advanced by a phase angle larger than 90° relative to the waveform-shaped output signal Pt during the half-rotation period HL and becomes a square wave signal whose phase is delayed by a phase angle larger than 90° relative to the waveform-shaped output signal Pt during the half-rotation period as shown in FIG. 8B.

The polarity inverted waveform-shaped output signal 29a, which results from inverting the waveform-shaped output signal Pf obtained from the level comparator 23 based on the side beam detecting signal Sf by the inverter 29, becomes a square wave signal whose phase is advanced by a phase angle smaller than 90° relative to the waveform-shaped output signal Pt during the half-rotation period HL and becomes a square wave signal whose phase is delayed by a phase angle smaller than 90° relative to the waveform-shaped output signal Pt during the half rotation period HR as shown in FIG. 8D.

Consequently, the D-type flip-flop 24 supplied with the waveform-shaped output signals Pt and Pe detects the level of the waveform-shaped output signal Pe obtained at the leading edge of the waveform-shaped output signal Pt. The compared output signal Ss from the D-type flip-flop 24 is held at a positive constant value during the half-rotation period HL and held at a negative constant value during the half-rotation period HR as shown in FIG. 8C.

In the switching unit 25 whose control terminal is supplied with the compared output signal Ss from the D-type flip-flop 24, the switches 25a, 25c are turned on and the switches 25b, 25d are turned off during the half-rotation period HL where the compared output signal Ss is held at a positive constant value. Also, the switches 25b, 25d are turned on and the switches 25a, 25c are turned off during the half-rotation period HR where the compared output signal Ss is held at a negative constant value.

During the half-rotation period HR, the waveform-shaped output signal Pe is supplied through the switch 25b in the switching unit 25 to the clock terminal C of the D-type flip-flop 26. Also, the polarity inverted waveform-shaped output signal 29a is supplied through the switch 25d in the switching unit 25 to the data terminal D of the D-type flip-flop 26. Therefore, the D-type flip-flop 26 detects the level of the polarity inverted waveform-shaped output signal 29a to thereby detect whether the phase of the polarity inverted waveform-shaped output signal 29a is advanced or delayed relative to the phase of the waveform-shaped output signal Pe. Consequently, the compared output signal Sp from the D-type flip-flop 26 is held at a positive constant value as shown in FIG. 8E.

As described above, the switching unit 25 forms the phase comparison control unit which controls the phase comparing operation mode in the D-type flip-flop 26 in response to the polarity of the compared output signal Ss obtained from the D-type flip-flop 24. Therefore, the compared output Sp obtained from the D-type flip-flop 26 is held at the positive constant value both in the half-rotation periods HL and HR.

The pulse output signal from the exclusive-OR circuit 27 which is supplied with the waveform-shaped output signal Pe and the polarity inverted waveform-shaped output signal 29a is converted into a pulse train having a width corresponding to a period where one of the waveform-shaped output signal Pe and the polarity inverted waveform-shaped output signal 29a is held at high level and the other is held at low level, i.e., a width corresponding to the phase difference between the waveform-shaped output signal Pe and the polarity inverted waveform-shaped output signal 29a both in the half-rotation periods HL and RL as shown in FIG. 8F. Thus, as shown in FIG. 8G, the output signal Sh from the low-pass filter 30 has a level corresponding to the phase difference between the waveform-shaped output signal Pe and the polarity inverted waveform-shaped output signal 29a.

Similarly, in the "closed state", the waveforms whose phases are different as shown in FIGS. 9A through 9G are presented similarly to FIGS. 8A through 8G. In the "closed state", the compared output signal Sp appears as a negative constant value.

That is, the phase-advanced or phase-delayed condition of the beam spots Be, Bf of the two side beams is supplied to the output terminal 28 as the phase-advanced and phase-delayed signal Sp. In the "opened state", the signal Sp is held at a positive value and in the "closed state", the signal Sp is held at a negative value.

Further, since the output signal Sh from the low-pass filter 30 becomes an absolute value detecting signal representative of a phase difference between the side beam detecting signal Se and the side beam detecting signal Sf, the absolute value of the phase can be obtained.

According to the above-mentioned conventional arrangement, the phase advance and delay discriminating signal for discriminating the advanced phase or delayed phase between the side beam detecting signals or both the advanced phase or delayed phase and a phase difference of the main beam detecting signal and the side beam detecting signals formed with respect to two side beams obtained from the reproducing system of the three-beam system optical disc through the photo-sensor unit 8 can be obtained by a relatively simplified arrangement. However, there is then the problem such that, when an eccentricity is produced due to a clearance between the spindle and a central aperture diameter of the optical disc D, a measurement accuracy becomes deteriorated to such an extent that it cannot be made negligible due to the phase difference of eccentricity in the vicinity of the portion where the phase difference between the waveform-shaped output signals Pe and Pf from the photo-sensor unit 8 is substantially zero.

When a maximum value of a phase difference generated by the eccentricity of the optical disc D is selected to be $\Delta\alpha_{max}$ and a phase difference between the signals Pe and Pf is selected to be $\alpha D°$, if $\alpha D \geq \Delta\alpha_{max}$ is satisfied, then a phase change $Vd_1$ caused by the eccentricity does not exceeds $0°$ as shown in a Lissajous waveform diagram in FIG. 10A and changes with a constant polarity so that substantially accurate value can be obtained. Therefore, there occurs no problem if it is determined whether the compared signal output is positive or negative and if the value of the phase absolute value Sh is measured, respectively.

If $\alpha D<\Delta\alpha_{max}$ is satisfied, a phase difference change $Vd_2$ due to the eccentricity exceeds $0°$ and is changed as shown in FIG. 10B. As a result, it cannot be accurately determined whether the compared signal output Sp is positive or negative. Thus, an error occurs in the measured phase difference.

If a difference between measured data used to calculate the phase difference absolute value and to determine whether the compared signal output Sp is positive or negative and a true value is calculated in simulation fashion, we have the following results shown in FIGS. 11A, 11B.

FIG. 11A shows an eccentricity waveform obtained when the optical disc D is rotated once under the condition that $\alpha D<\Delta\alpha_{max}$ satisfied. In this case, the real measured values and the true values of the phase differences represent substantially equal values.

FIG. 11B shows an eccentricity waveform obtained when the optical disc D is rotated once under the condition that $\alpha D<\Delta\alpha_{max}$ is satisfied. As shown in FIG. 11B, an absolute value of the phase difference becomes a value which results from averaging the portions shown hatched. Therefore, the polarity of the compared signal output Sp cannot be determined accurately. By way of example, when the eccentricity amount of the optical disc D is taken as $\Delta y$ and a difference between the true value $\alpha D$ and the measured value $\alpha$ is calculated, if a radius of the optical disc D is r, a phase difference between the side beam detecting signals Se, Sf of the photo-sensor unit 8 is taken as $\Delta\alpha$ and one sampling is taken as n, then the true value $\alpha D$, the measured value $\alpha$ and a difference $\alpha-\alpha D$ between the true value $\alpha D$ and the measured value $\alpha$ are illustrated on the following table where the sampling value n=36, the radius r=24 and the eccentricity value $\Delta y=30$ μm.

TABLE

| $\alpha D$ | 0° | 2° | 5° | 7° | 10° | 12.94° |
|---|---|---|---|---|---|---|
| $\alpha$ | 8.22° | 8.33° | 9.54° | 9.55° | 10.82° | 12.94° |
| $\alpha-\alpha D$ | 8.22 | 6.33 | 4.54 | 2.55 | 0.82 | 0 |

Having compared a relationship between the true value $\alpha D$ and the measured value $\alpha$ with an ideal line, it is to be understood that an error occurs in the vicinity of the phase difference $0°$ as shown in FIG. 12.

OBJECTS AND SUMMARY OF THE INVENTION

Therefore, it is an object of the present invention to provide an improved phase difference detecting apparatus in which the aforesaid shortcomings and disadvantages encountered with the prior art can be eliminated.

More specifically, it is an object of the present invention to provide a phase difference detecting apparatus in which an advanced phase or delayed phase can be discriminated accurately and a phase difference can be measured accurately in the portion where a phase difference is substantially zero.

It is another object of the present invention to provide a phase detecting apparatus which can eliminate a phase difference error occurring when a track row direction is inverted.

According to an aspect of the present invention, there is provided a phase difference detecting apparatus which comprises a swinging direction discriminating means for discriminating on the basis of three beams obtained from a three-beam system the optical head swinging directions in which tracks and said three beams are made perpendicular to one another, an advance phase and delay phase detecting means for detecting an advanced or delayed phase by a side beam detecting signal obtained from side beam photo-detecting means on the basis of two side beams of said three beams, a phase difference absolute value detecting means for detecting an absolute value of a phase difference on the basis of the detecting signal from said photo-detecting means, and a polarity adding circuit connected to an output side of said phase difference absolute value detecting means and being controlled on the basis of a judged signal of said advance phase and delay phase detecting means to determine a polarity of an absolute value detecting output signal.

The above and other objects, features, and advantages of the present invention will become apparent from the following detailed description of illustrative embodiments thereof to be read in conjunction with the accompanying drawings, in which like reference numerals are used to identify the same or similar parts in the several views.

BRIEF DESCRIPTION OF THE DRAWINGS

FIGS. 4A to 4C are diagrams of waveforms of a main beam detecting signal and side beam detecting signals obtained from the photo-sensor unit shown in FIG. 3, respectively;

FIGS. 5A to 5C are diagrams of waveforms of other main beam detecting signals and side beam detecting signals obtained from the photo-sensor unit shown in FIG. 3, respectively;

FIGS. 8A through 8G are diagrams of waveforms used to explain operation of the conventional phase difference detecting apparatus according to the prior art, respectively;

FIGS. 17A through 17S are respectively waveform diagrams used to explain the phase difference detecting apparatus according to the embodiment of the present invention;

FIGS. 19A through 19H are respectively diagrams of waveforms used to explain operation of the phase difference detecting apparatus of the present invention under the condition that the beam spots are in the opened state.

DETAILED DESCRIPTION OF THE PREFERRED EMBODIMENTS

Figure 1:
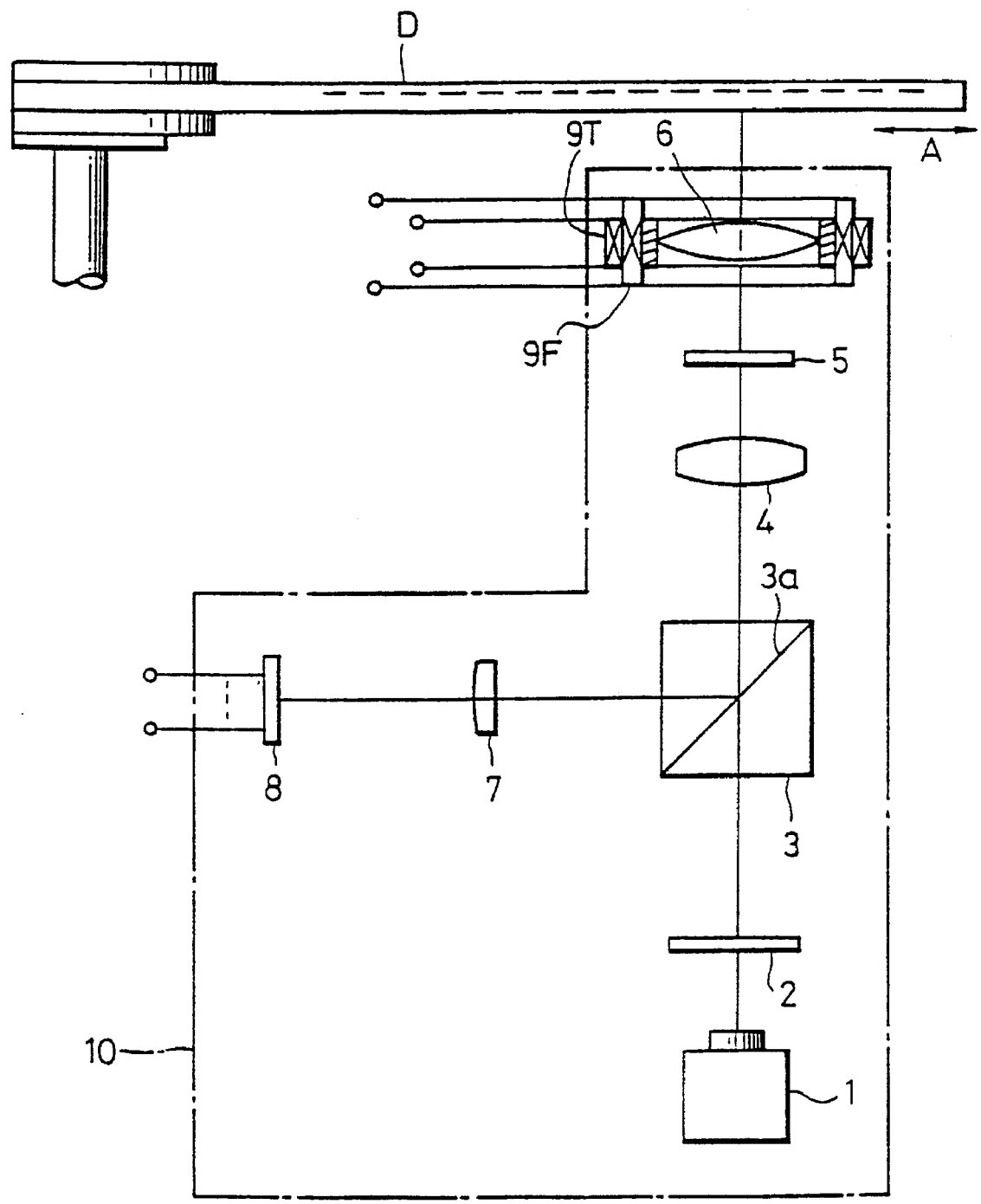
FIG. 1 is a diagram showing a structure of a conventional optical system block.

Referring to the drawings in detail, and initially to FIGS. 13 to 16, a phase difference detecting apparatus according to a first embodiment of the present invention will be described hereinafter.

Figure 7:
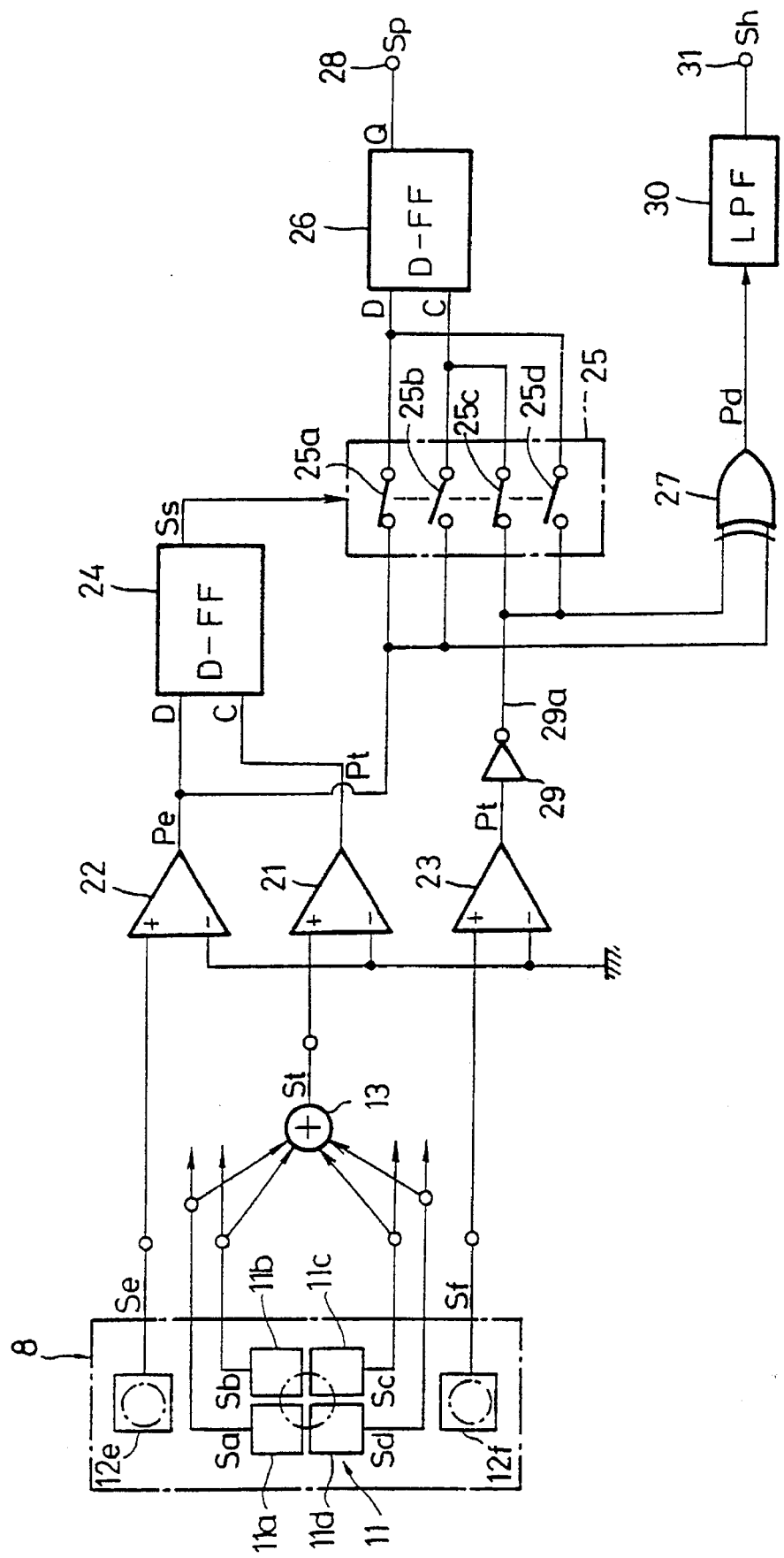
FIG. 7 is a block diagram showing a conventional phase difference detecting apparatus.
Figures 9A, 9B, 9C, 9D, 9E, 9F, 9G:
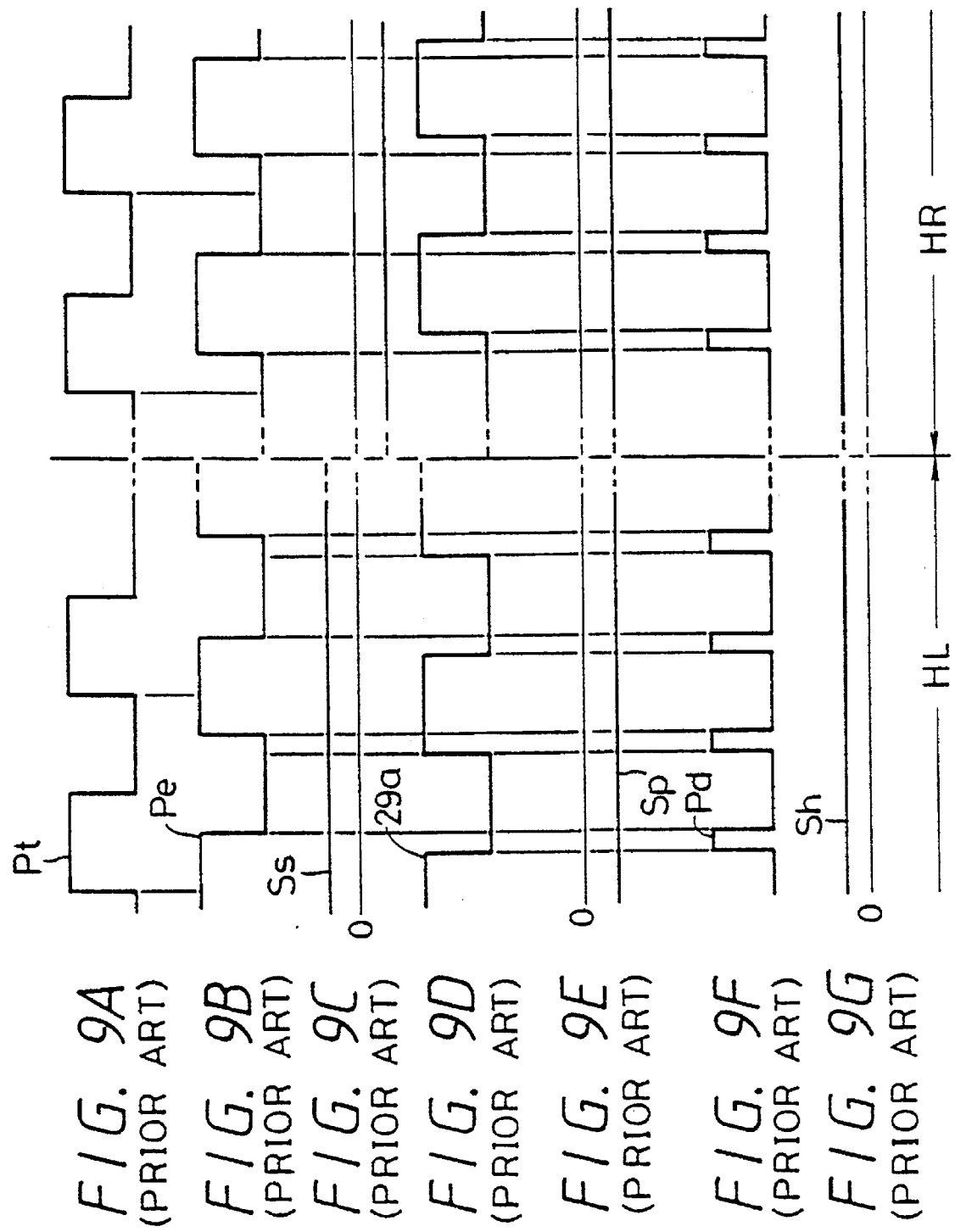
FIGS. 9A through 9G are diagrams of waveforms used to explain other example of operation of the conventional phase difference detecting apparatus according to the prior art.
Figure 10A:
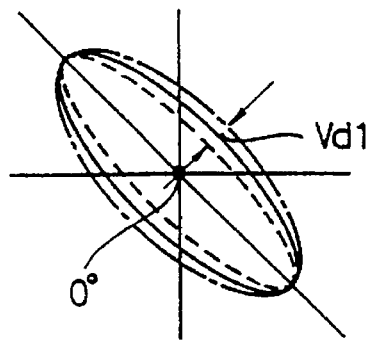
FIGS. 10A and 10B are Lissajous waveform diagrams used to explain an influence of an eccentricity, respectively.
Figure 10B:
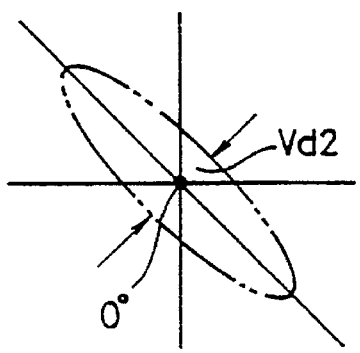
Figure 12:
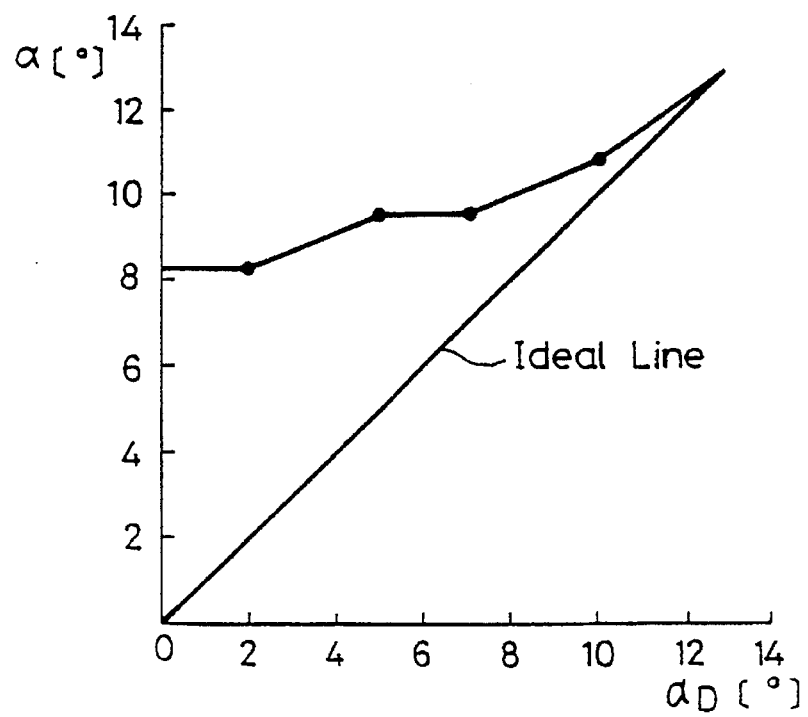
FIG. 12 is a graph where true values and measured values are plotted respectively.
Figure 11A:
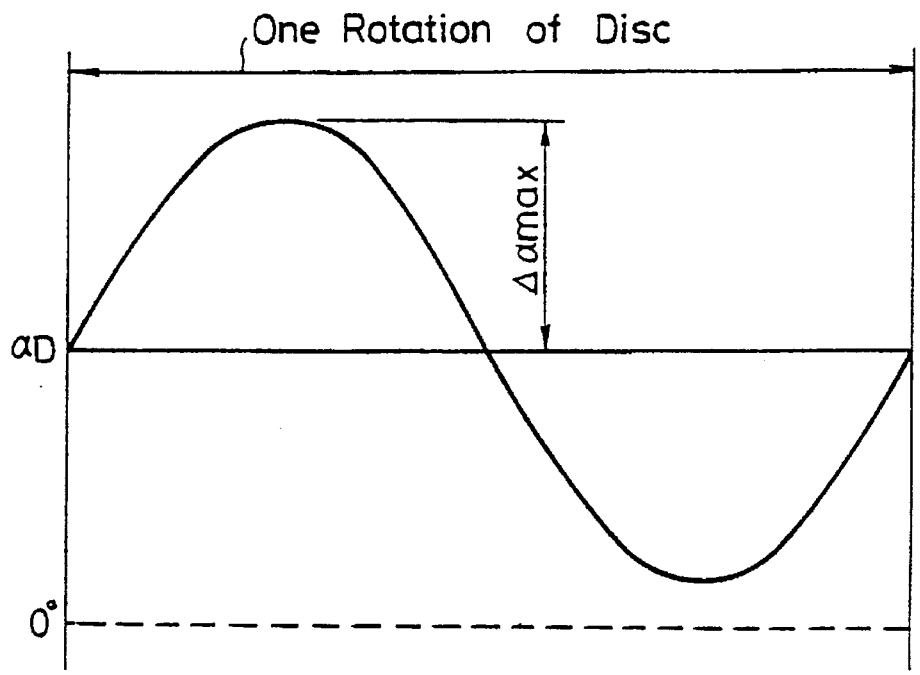
FIGS. 11A and 11B are respectively waveform diagrams used to explain a difference between a measured value and a true value in the vicinity of a portion where a phase difference is zero.
Figure 11B:
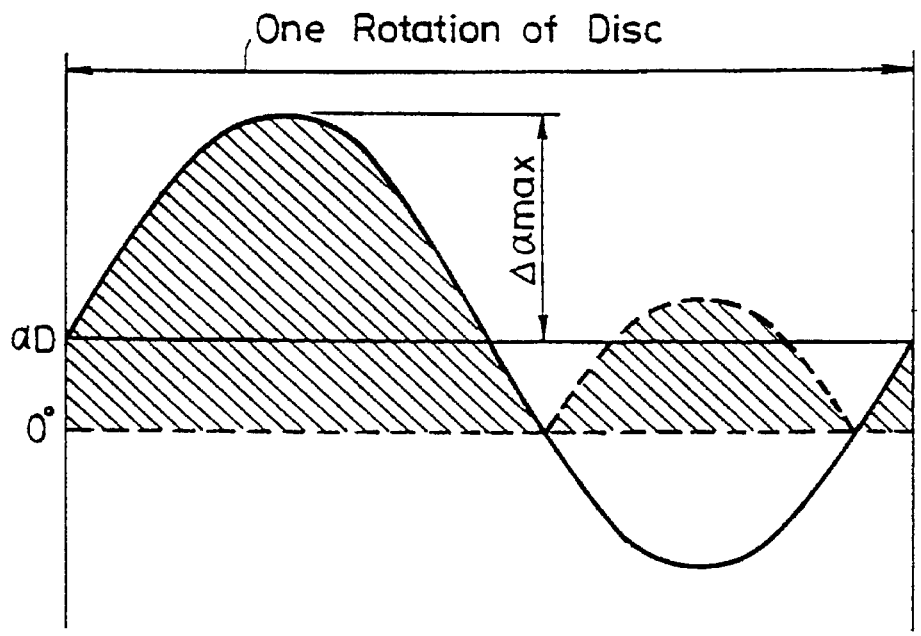
Figure 13:
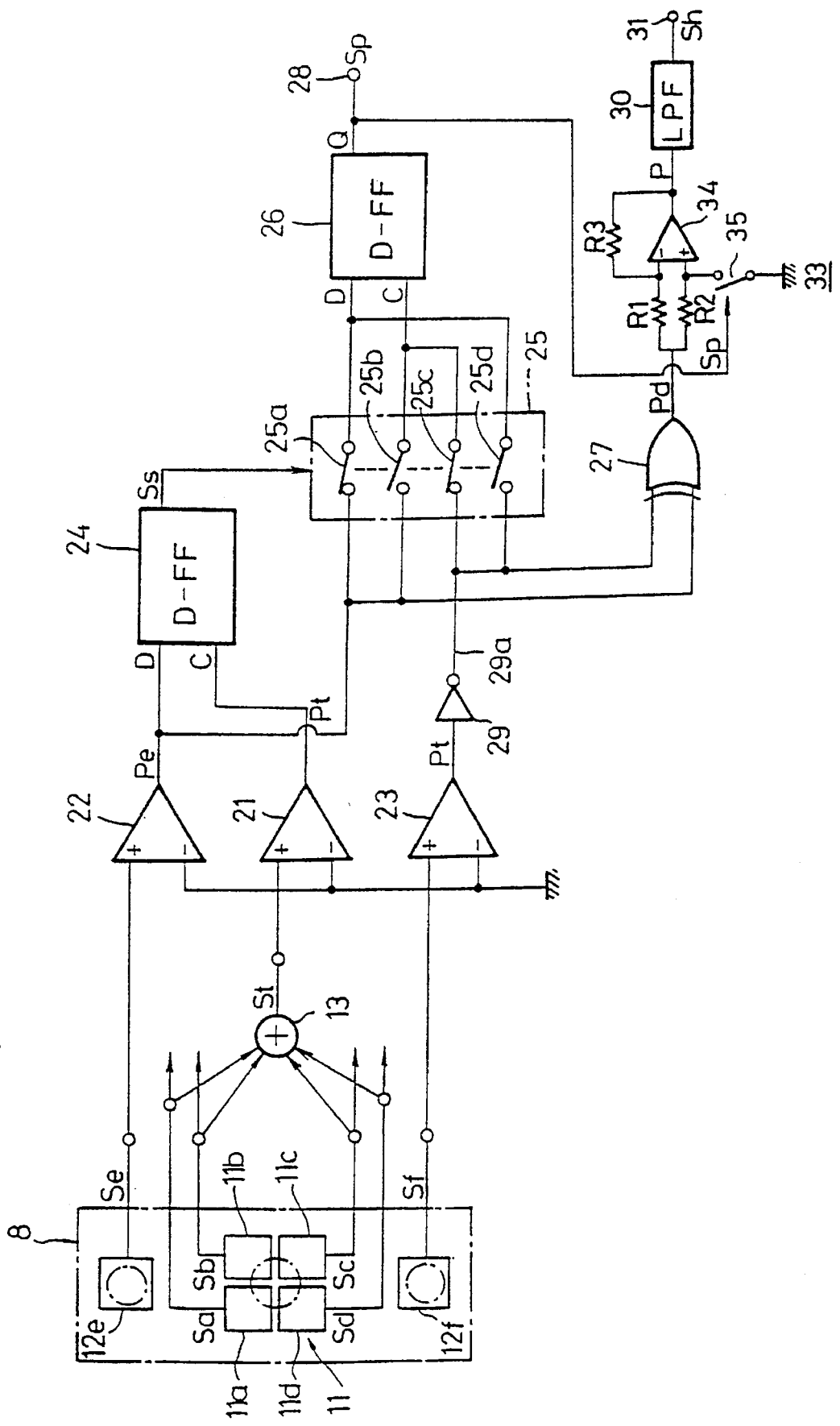
FIG. 13 is a block diagram showing an arrangement of a phase difference detecting apparatus according to an embodiment of the present invention.

FIG. 13 is a block diagram showing an arrangement of the phase difference detecting apparatus according to the first embodiment of the present invention. In FIG. 13, like parts corresponding to those of FIG. 7 are marked with the same references and therefore need not be described in detail.

According to this embodiment, the side beam detecting signals Se and Sf obtained from the side beam detectors 12e and 12f in the photo-sensor unit 8 are supplied to and compared in level with a reference voltage by the level comparators 22 and 23 which detect the change of level, thereby being produced as the waveform-shaped output signals Pe and Pf. The output signal Pe is supplied to the D-type flip-flop 24 together with the waveform-shaped output signal Pt obtained from the level comparator 21. Then, the D-type flip-flop 24 detects whether the phase of the output signal Pe is advanced or delayed with respect to the phase of the waveform-shaped output signal Pt. That is, the D-type flip-flop 24 serves as a swinging direction judging unit which judges the swinging direction of the track row when the track row is swung by the eccentricity in the direction perpendicular to the laser beam when the optical disc D is rotated. The D-type flip-flop 24 controls the switches 25a through 25d in the switching unit 25.

The switching unit 25 and the exclusive-OR circuit 27 that is used to detect the absolute value of the phase difference between the side beams are supplied with the inverted signal 29a which results from inverting the waveform-shaped output signal Pf by the inverter 29 similarly to the waveform-shaped output signal Pe.

According to this embodiment, a polarity adding circuit 33 is additionally interposed between the exclusive-OR circuit 27 and the low-pass filter (LPF) 30 of the phase difference absolute value detecting unit.

In the polarity adding circuit 33, a differential amplifier 34 is supplied at its inverting and non-inverting input terminals with the absolute value detecting signal Pd representative of a phase difference through resistors $R_1$ and $R_2$. A resistor $R_3$ is connected between the output end and the inverting input terminal of the differential amplifier 34. A switch 35 is connected between the non-inverting input terminal of the differential amplifier 34 and the ground. The switch 35 is turned on and off by the compared output signal Sp from the phase advance and phase delay judging unit of the D-type flip-flop 26.

An output added with the polarity added from the polarity adding circuit 33 is supplied through the low-pass filter 30 to the output terminal 31 as the output signal Sh.

According to the above arrangement, by sampling individual sampling data in the form of positive or negative signs when $\alpha D < \Delta \alpha_{max}$ to thereby average the sampling data, it is possible to avoid inaccurate absolute values of phase differences generated upon measurement due to the eccentricity.

Figure 14:
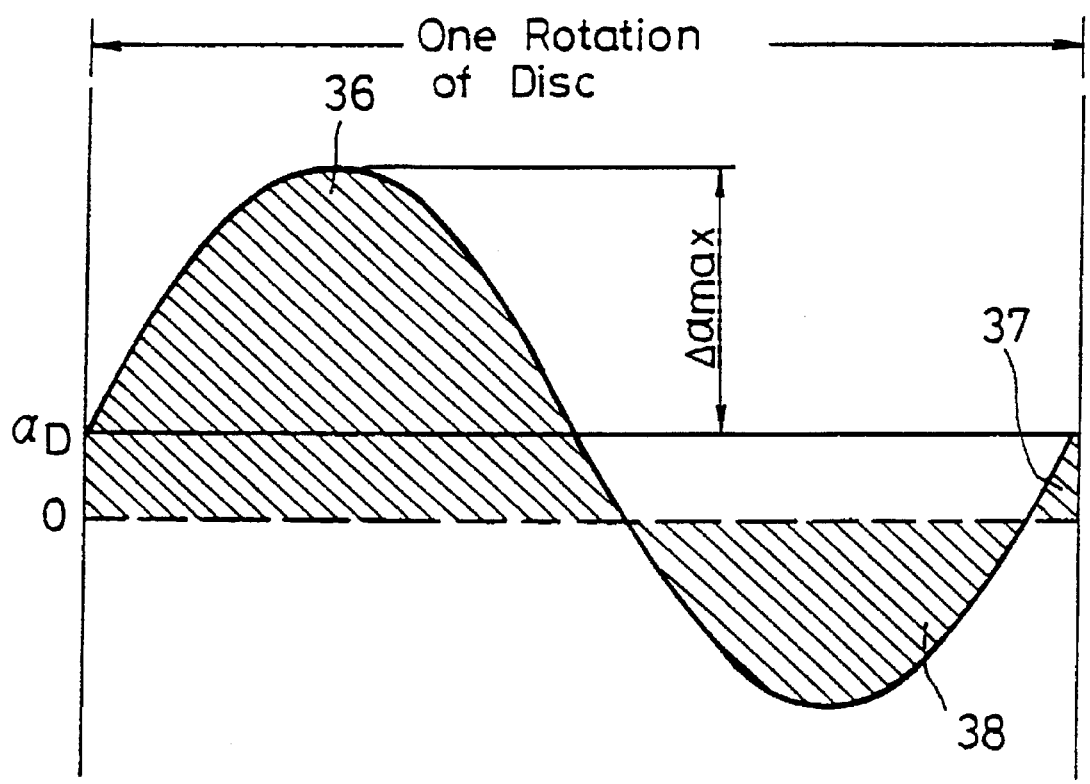
FIG. 14 is a diagram used to explain a polarity added waveform according to the present invention.

A positive polarity may be added to waveforms shown hatched in FIG. 14 and a negative polarity may be added to a waveform 38 shown hatched. These waveforms 36, 37 and 38 may be averaged by the low-pass filter 30.

Figure 15A:
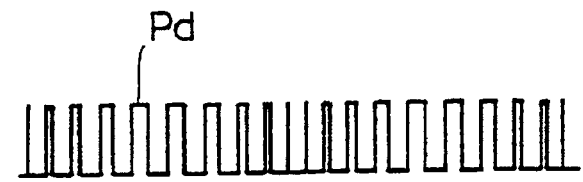
FIGS. 15A through 15D are respectively diagrams used to explain waveforms of a polarity adding circuit used in the phase difference detecting apparatus according to the present invention.

The absolute value of the phase difference obtained from the exclusive-OR circuit 27 is output in the form of large and small pulse widths as shown in FIG. 15A. That is, if the grating is adjusted correctly and an error is 0°, then a pulse of the absolute value detecting signal Pd is not generated.

A change of a duty ratio shown in FIG. 15A is generated by the phase difference caused by the eccentricity or the like based on a gap between the spindle insertion central aperture diameter of the optical disc D and an outer diameter of a spindle when the optical disc D is inserted into the spindle.

Figure 15B:
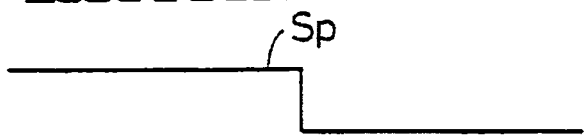
Figure 15C:
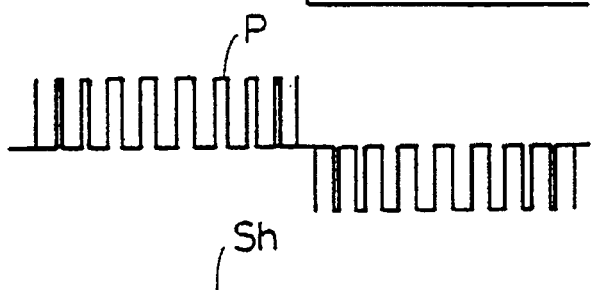

When the compared output signal Sp from the D-type flip-flop 26 in the phase advance and phase delay judging unit which determines whether the phase difference between the two side beams is advanced or delayed is changed as shown in FIG. 15B and turns the switch 35 off, the output signal P from the differential amplifier 34 becomes positive. When the compared output signal Sp turns the switch 35 on, the output signal P from the differential amplifier 34 becomes negative, whereby the positive or negative polarity is added to the absolute value detecting signal Pd as shown in FIG. 15C. If the absolute value detecting signal is smoothed by the low-pass filter 30, then it is held at substantially zero value.

Figure 15D:
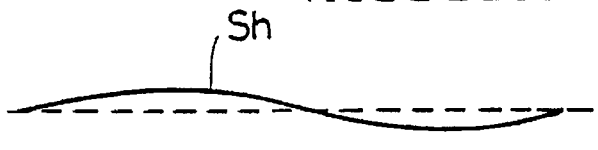

FIG. 15D shows an output signal smoothed by the low-pass filter 30 and which is then developed at the output terminal 31.

Figure 16A:
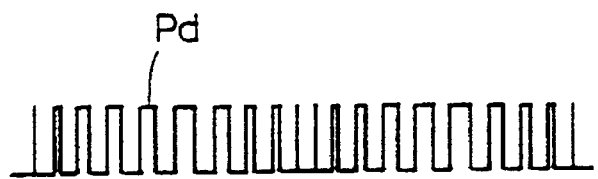
FIGS. 16A to 16C are respectively diagrams used to explain waveforms provided in the vicinity of a portion where a phase difference is zero according to the prior-art phase difference detecting apparatus.
Figure 16B:
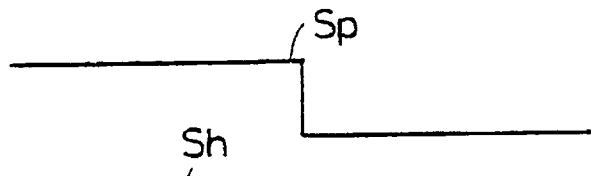
Figure 16C:

If waveforms similar to those shown in FIGS. 15A through 15C are applied to the prior art disclosed in Japanese Laid-Open Patent Publication No. 2-56743, then such waveforms become as shown in FIGS. 16A, 16B and 16C in the vicinity of the portion where the phase difference is 0°. Therefore, it is apparent that the output signal Sh is inverted at every rotation of the optical disc D and is not determined in polarity. Thus, the output signal Sh is not reduced to zero completely and a DC value remains therein.

According to the first embodiment, the polarity adding circuit 33 is additionally interposed between the exclusive-OR circuit 27, which serves as the absolute value detecting unit, and the low-pass filter 30, whereby the advanced phase or delayed phase in the vicinity of phase difference 0° can be accurately determined and also the phase difference can be measured accurately.

Figure 3:
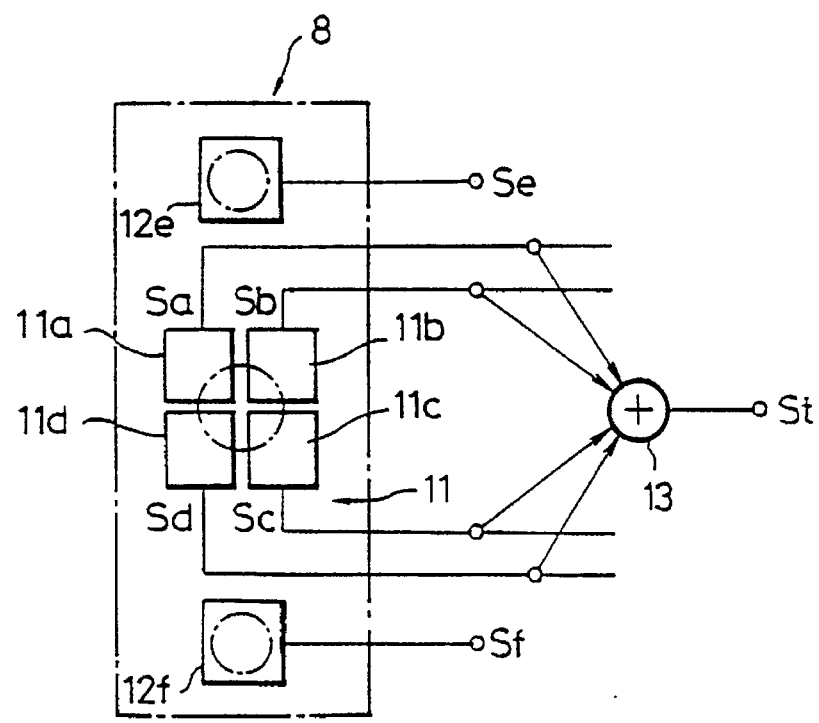
FIG. 3 is a diagram showing a structure of a photo-sensor unit used in the optical system block shown in FIG. 1.
Figure 6:
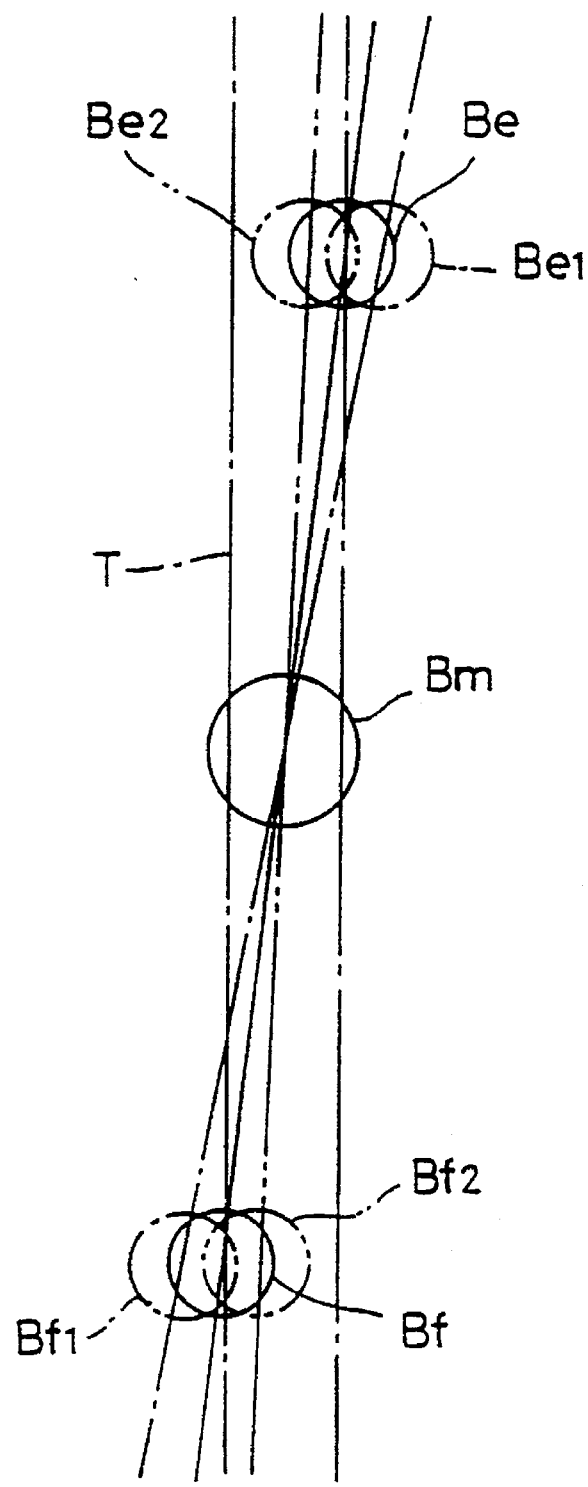
FIG. 6 is a diagram used to explain a positional relationship among a beam spot formed by a main beam and beam spots formed by two side beams on the optical disc.

Assuming now that the main beam and the side beams are radiated on the photo-detecting elements 11a to 11d and 12e, 12f of the photo-sensor unit 8 shown in FIG. 3 and the adding unit 13 derives the main beam detecting signal St corresponding to the main beam from the optical disc D and the side beam detecting signals Se, Sf corresponding to the two side beams, then these detecting signals St, Se and Sf are illustrated in FIGS. 17A, 17B and 17C. In FIG. 17, a virtual line depicted by reference numeral 40 represents the inverted position obtained when the track row of the optical disc D is swung in the direction perpendicular to the main beam and the side beams due to the eccentricity. The waveforms on the left side of the virtual line 40 shows the case such that the track row is moved in the left direction. The waveform on the right side of the virtual line 40 represents the case such that the track row is moved in the right direction. Further, broken lines in FIGS. 17A, 17B, 17C show the condition that the beam spot of the main beam and the beam spots of the two side beams are located at ideal positions.

The main and side beam detecting signals St, Se, Sf are supplied to the level comparators 21, 22 and 23, from which there are obtained the waveform-shaped output signals Pt, Pe and Pf as earlier noted with reference to FIG. 7. Then, these waveform-shaped output signals Pt, Pe and Pf can be illustrated in FIGS. 17D, 17E and 17F similarly to FIGS. 8A through 8G and FIGS. 9A through 9G. FIG. 17G shows the pulse output Pd of the exclusive-OR circuit 27 and which becomes a pulse representative of the phase difference between the side beam detecting signals Se and Sf.

Figure 18:
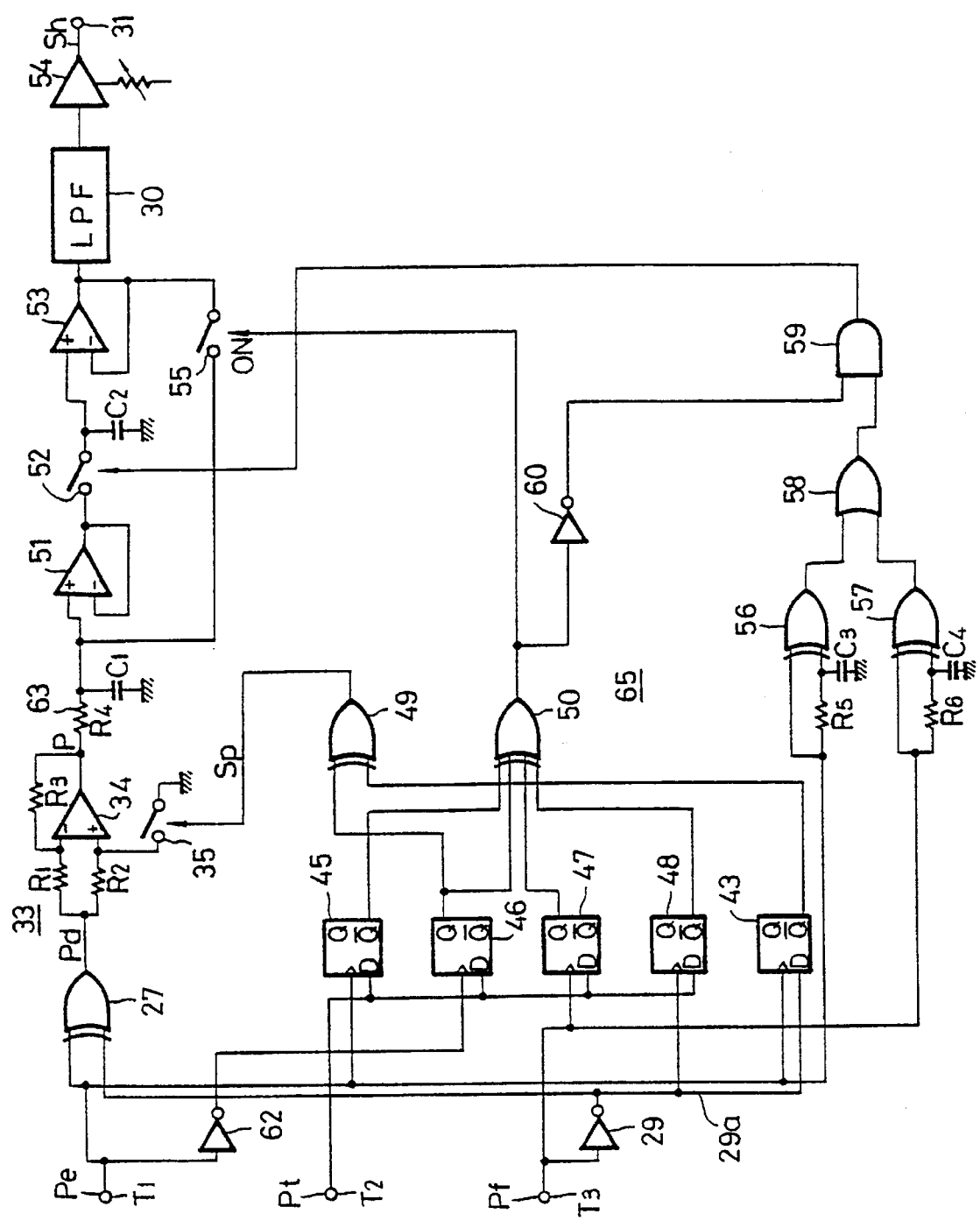
FIG. 18 is a block diagram showing the phase difference detecting apparatus according to another embodiment of the present invention.
Figure 20A:
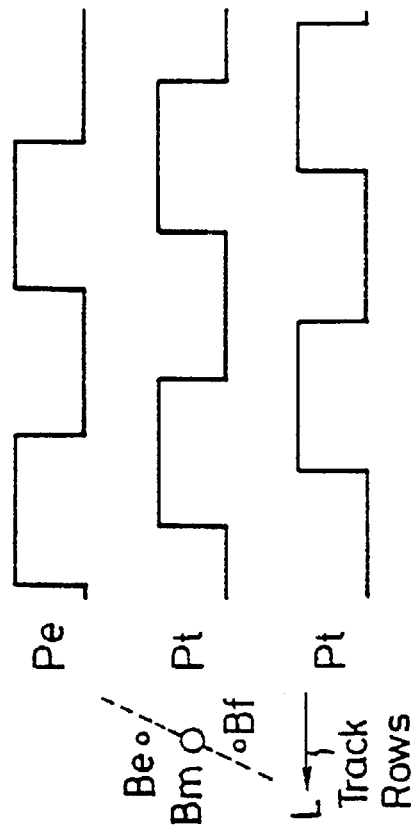
FIGS. 20A through 20H are respectively diagrams of waveforms used to explain operation of the phase difference detecting apparatus of the present invention under the condition such that the beam spots are in the closed state.
Figure 20B:
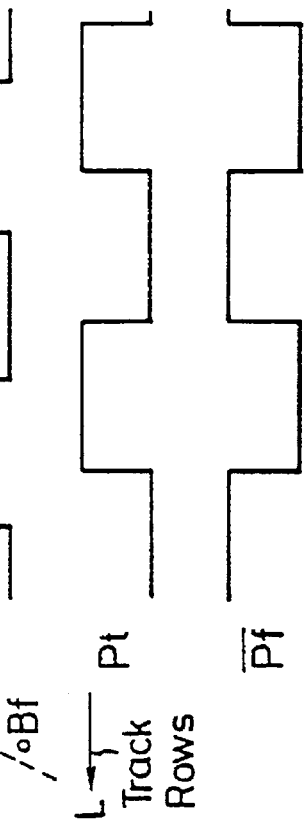
Figure 20C:
Figure 20D:
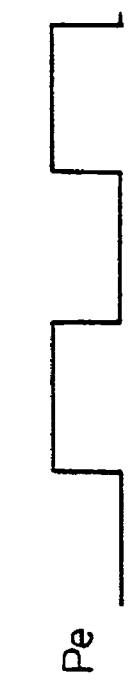
Figure 20E:
Figure 20F:
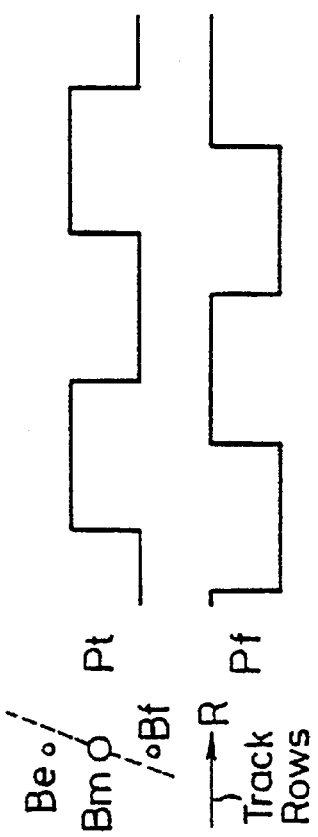
Figure 20G:
Figure 20H:

While the track direction is determined by supplying the waveform-shaped output signals Pe and Pt to the D-type flip-flop 24 as described above with reference to FIG. 13, the present invention is not limited thereto and the waveform-shaped output signals Pf and Pt can be used as the track direction determining signals by supplying inverted or non-inverted signals of the waveform-shaped output signals Pf and Pt to a similar D-type flip-flop. More specifically, as shown in waveform diagrams of FIGS. 17H, 17I, 17J and 17K, the swinging direction of the track row can be detected by using four D-type flip-flops, as shown in FIG. 18.

If the swinging direction of the track row is determined by the trailing edge of a waveform (see FIGS. 17D) obtained when the waveform-shaped signal Pe is inverted and a state detecting waveform (see FIGS. 17I) of the waveform-shaped signal Pt, then this inverted position becomes a polarity discriminating signal (see FIG. 17M) containing an error EP as shown in FIG. 17M because the inverted signal is displaced from a phase advance and phase delay signal (see FIG. 17L) derived from a D-type flip-flop 43 (described later on) which is operated similarly to the D-type flip-flop 26 (see FIG. 13) which is supplied with the waveform-shaped signal Pe and the inverted signal 29a of the waveform-shaped signal Pf.

Therefore, when the switch 35 in the polarity adding circuit 33 is controlled by the phase difference discriminating signal Sp containing the error EP, then a reverse pulse 44 occurs in the phase difference signal between the polarity added waveform-shaped signals Pe and Pf as shown in FIG. 17N.

The reverse pulse 44 may eliminated, as shown in FIG. 17H, by controlling the discrimination of the track row swinging direction by supplying the leading edge of the waveform-shaped waveform signal Pe and the waveform-shaped signal Pt to a predetermined D-type flip-flop 45, and using the output of the D-type flip flop 45 to control the swinging direction discriminator switch 25.

If the track row swinging direction is discriminated, the coincidence of the waveform shown in FIG. 17L with one of waveforms shown in FIGS. 17H to 17K cannot be determined because the above discrimination is determined based on the beam spot of the main beam and the beam spots of the two side beams on the track when the track row swinging direction is inverted (when the moving speed of the track row becomes zero).

Further, even when any one of the waveforms shown in FIGS. 17H to 17K is selected as the discriminating signal of the track row swinging direction, these inverted positions are delayed from the inverted position shown by the virtual line 40 in the true track row swinging direction of FIG. 17 without fail, thereby a delay period 61 shown in FIG. 17N being produced. There is then the disadvantage such that such error cannot be compensated upon inversion.

The phase difference detecting apparatus according to a second embodiment of the present invention will be described with reference to FIGS. 18 to 20. This phase difference detecting apparatus can solve the above-mentioned problem and accurately measure a phase difference between the waveform-shaped signals Pe and Pf; a sample and hold means ensures that the final output is not affected by the error. In FIG. 18, like parts corresponding to those of FIG. 13 are marked with the same references.

As shown in FIG. 18, to input terminals $T_1$, $T_2$ and $T_3$, there are supplied binary value waveform-shaped signals Pe, Pt and Pf (hereinafter simply referred to as signals Pe, Pt and Pf) which result from comparing the main beam detecting signal St and the side beam detecting signals Se, Sf output from the photo-sensor unit 8 with the level reference signal. FIGS. 17A, 17B and 17C show the waveforms of the signals Pe, Pt and Pf.

The signal Pe input to the input terminal $T_1$ is supplied to one input terminal of the exclusive-OR circuit 27, clock terminals of a first D-type flip-flop 45 and a fifth D-type flip-flop 43 and both input terminals of a second exclusive-OR circuit 56. The signal Pe is inverted by an inverter circuit 62 and the inverted signal is supplied to the clock terminal of a second D-type flip-flop 46.

The signal Pt (FIG. 17E) input to the input terminal $T_2$ is supplied to data input terminals D of the first to fourth D-type flip-flops 45, 46, 47 and 48.

The signal Pf (FIG. 17F) input to the input terminal $T_3$ is supplied to the clock terminal of the third D-type flip-flop 47 and both input terminals of the third exclusive-OR circuit 57. The inverted signal 29a which results from inverting the signal Pf by the inverter circuit 29 is supplied to the clock terminal of the fourth D-type flip-flop 48 and the data terminal of the fifth D-type flip-flop 43.

The pulse output signal Pd from the exclusive-OR circuit 27 is supplied to the polarity adding circuit 33 which is similar to that of FIG. 13. This pulse output signal Pd is supplied to a filter 63 composed of the output end of the polarity adding circuit 33, the capacitor C1 and the resistor R4, in which it is filtered out to provide a smoothed DC component. A positive output Q of the second D-type flip-flop 46 and a negative output Q of the fifth D-type flip-flop 43 are supplied to the fourth exclusive-OR circuit 49 whose output signal is served as the compared output signal Sp to control the switch 35 in the polarity adding circuit 33.

An output of the filter 63 is supplied to a sample and hold circuit 51 to 55 which are used to avoid the occurrence of the error signal caused when the track row swinging direction is inverted, thereby increasing accuracy in the measurement.

The waveform-shaped signal Pe smoothed by the filter 63 and the phase difference absolute value signal of the inverted signal Pf are supplied to a non-inverting input terminal of the buffer operational amplifier 51 and a fixed contact of the switch 55. A movable contact of the switch 55 is connected to the input side of the low-pass filter 30.

The inverting input terminal of the buffer 51 is connected to the output end thereof and the output end of the buffer 51 is connected through the switch 52 to a non-inverting input terminal of other operational amplifier 53. The capacitor C2 is connected between the movable contact of the switch 52 and the ground. The inverting input terminal of the operational amplifier 53 is connected to the output end thereof and also to the low-pass filter 30. An output of the low-pass filter 30 is supplied through a gain adjusting amplifier 54 to the output terminal 31 as the output signal Sh. This output signal Sh is supplied to a display device or the like, for example.

The switches 52 and 55 are controlled by a sample and hold control signal from a sample and hold control signal generating circuit 65.

More specifically, the switch 55 is turned on and off by an output signal from a fifth exclusive-OR circuit 50 to which there are supplied negative outputs Q of the first and fourth D-type flip-flops 45 and 48 and positive outputs Q of the second and third D-type flip-flops 46, 47 of the first to fourth D-type flip-flops 45 to 48.

An output which results from inverting the output of the exclusive-OR circuit 50 by an inverter circuit 60 is supplied to one input terminal of an AND gate 59. Outputs of the second and third exclusive-OR circuits 56 and 57 are supplied to an OR gate 58. An output of the OR gate 58 is supplied to the other input terminal of the AND gate 59 and the switch 52 is turned on and off by the output of the AND gate 59.

Operation of the phase difference detecting apparatus shown in FIG. 18 will be described below. The circuits 27 and 33 shown in FIG. 18 are operated in exactly the same manner as that of the first embodiment. In the exclusive-OR circuit 27, the phase difference between the waveform-shaped signals formed of the signals Pe and the inverted signal Pf shown in FIGS. 17D and 17F is detected as the absolute value signal Pd as shown in FIG. 17G. This absolute value signal Pd is added with a polarity by the polarity adding circuit 33.

As the track row swinging direction discriminating control means for controlling the switch 35 in the polarity adding circuit 33, there are provided the first to fourth D-type flip-flops 45, 46, 47 and 48. Predetermined D-type flip-flops can be used as shown in FIGS. 17H, 17I, 17J and 17K. In FIG. 18, the positive output Q of the second D-type flip-flop 46 and the positive output Q of the fifth D-type flip-flop 43 are calculated in an exclusive-OR fashion. These discriminated positions take various inverted positions and hence incur the above-mentioned problems.

The D-type flip-flop 43 outputs the phase advance and phase delay signal of the signal Pe, where the track row swinging direction is corrected, and the inverted signal Pf. The fourth exclusive-OR circuit 49 and the D-type flip-flop 43 are operated in substantially the same manner as those of the switching circuit 25 and the D-type flip-flop 26 shown in FIGS. 13 and 7. That is, the fourth exclusive-OR circuit 49 outputs the phase difference and polarity discriminating compared signal Sp (containing an error) of the signal Pe, where the influence exerted when the track row is swung is corrected, and the inverted signal Pf.

Therefore, the phase difference detecting apparatus according to the second embodiment of the present invention is operated in substantially the same manner as that of FIG, 13. Operation in which the track is moved in the arrow L and R directions in FIG, 2 when the track row is in the stationary state according to the second embodiment will be described below.

Figure 2:
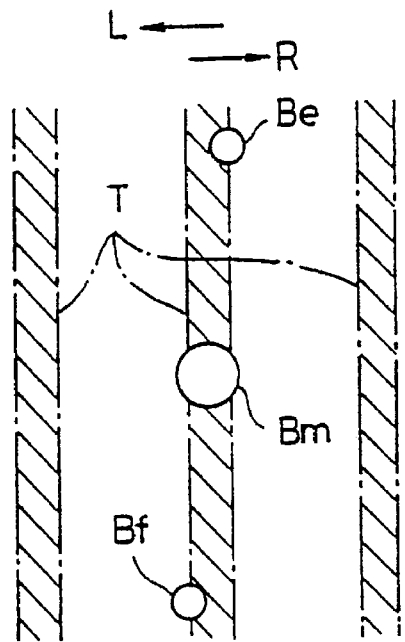
FIG. 2 is a diagram used to explain the condition that a main beam and two side beams are introduced into an optical disc from the optical system block shown in FIG. 1.

Let it be assumed that the side beam Be, the main beam Bm and the side beam Bf are located at the ideal positions shown in FIG. 2 and that the opened state where the rows of the track T are moved in the arrow L direction in FIG. 2 is presented. In this case, since the phases of the waveform-shaped signals Pe, Pt and Pf are advanced in that order, outputs from the D-type flip-flops 45, 46, 47, 48 and 43 go to high "H" level as shown in FIGS. 19A through 19D (see left sides of FIGS. 17H, 17I, 17J, 17K, 17L).

Accordingly, the output of the exclusive-OR circuit 49 goes to low "L" level and the output of the exclusive-OR circuit 50 also goes to low "L" level. Assuming now that the switches 35, 52 and 55 are at high "H" level and turned on, then the switches 35, 55 are at low "L" level and turned off. Therefore, the side beam Be, the main beam Bm and the side beam Bf are set in the opened state. Accordingly, the polarity adding circuit 33 outputs the signal corresponding to the phase difference amount between the positive polarity signals Pe and Pf.

Further, the detection is effected at the leading and trailing edges of both pulses of the signals Pe and Pf from the exclusive-OR circuits 56 and 57 and the detected signal is supplied to the OR gate 58. Accordingly, the edge pulse shown in FIG. 17P is supplied to the OR gate 58 and the output of the OR gate 58 is supplied to the AND gate 59. Although the output of the exclusive-OR circuit 50 is at low "L" level, this low level output is inverted by the inverter circuit 60 to go to high "H" level. Then, this high "H" level output is supplied to the AND gate 59 so that both edge pulses 77, 79 (see FIG. 17Q) of the signals Pe and Pf are supplied through the AND gate 59 to turn on and off the switch 52.

More specifically, each time both edge pulses are input, the switch 52 is turned on so that the phase difference amount of the signals Pe, Pf is sampled and held in the capacitor C2 from the polarity adding circuit 33 and the filter 63 through the buffer 51.

Since the phase difference amount thus sampled and held in the capacitor C2 is fundamentally equal to the value of the output shown in FIG. 17R, a value from which the sampling pulse carrier component is eliminated by the low-pass filter 30 is substantially the same value shown in FIG. 17R. Therefore, the signal Sh whose gain is adjusted by way of the gain adjustment amplifier 54 is supplied to the display device or the like connected to the output terminal 31 as an output difference output signal (see FIG. 17S) of the signals Pe and Pf. Thus, the display device effects the display.

When the side beam Be, the main beam Bm and the side beam Bf are moved from the ideal positions shown in FIG. 2 while the track row is moved in the arrow R direction shown in FIG. 2, the phase relationship of the signals Pe, Pt, Pf based on these beams and the inverted signal Pf are reversed as shown in FIGS. 19E, 19F, 19G and 19H.

Therefore, the outputs from the D-type flip-flops 45, 46, 47, 48, 43 go to low "L" level (see right sides of FIGS. 17H, 17I, 17K and 17L).

Accordingly, outputs of the exclusive-OR circuits 49 and 50 both go to low "L" level and the switches 35, 55 and 52 are set in the same conditions as those presented when the track row is moved in the arrow L direction in FIG. 2. Thus, the positive polarity DC component is output as a phase difference signal between the signals Pe and Pf.

A phase relationship of the signals Pe, Pt, Pf and the inverted signal Pf when the track row is moved in the arrow L and arrow R directions under the condition that the beam spots are in the closed state as shown in FIG. 20 is illustrated in FIGS. 20A through 20H. The phases of these signals Pe, Pt and Pf are advanced, in that order. Therefore, the outputs of the D-type flip-flops 45, 46, 47 and 48 go to high "H" level.

The output of the D-type flip-flop 43 goes to low "L" level because the phase of the inverted signal Pf is advanced from the phase of the signal Pe.

Accordingly, the output of the exclusive-OR circuit 49 is at high "H" level and the switch 35 in the polarity adding circuit 33 is turned on. Thus, the polarity adding circuit 33 outputs a phase difference amount between the negative polarity signals Pe and Pf, thereby making it possible to detect that the beam spots Be, Bm and Bf are moved in the counter-clockwise direction from the proper positions, i.e., that the beam spots Be, Bm and Bf are set in the closed state. In this case, the switches 52 and 55 are set in the same states as those presented when the beam spots Be, Bm and Bf are in the opened state. Further, even when the track row is reversed as shown in FIGS. 20E, 20F, 20G and 20H, in this case, the negative polarity DC component is output as the phase difference signal between the signals Pe and Pf.

Operation when the track row moving direction is inverted will be described below in detail.

FIGS. 17A through 17S respectively show timing charts in the condition such that the beam spots Be, Bm and Bf of the respective beams are displaced in the clockwise direction and set in the opened state as shown in FIGS. 19A through 19H.

As described before, since the track row moving direction detecting signal 70 (see FIG. 17I) from the D-type flip-flop 46 shown in FIG. 18 and the phase advance and phase delay signal 71 (see FIG. 17L) between the signals Pe and Pf from the D-type flip-flop 43 in FIG. 18 are inverted at different positions, a polarity discriminating signal 73 output from the exclusive-OR circuit 49 and which represents the phase difference between the signals Pe and Pf contains the error pulse EP. If this discriminating signal 73 is supplied to the switch 35, then a malfunction occurs in the switch 35 at the error pulse EP portion.

Accordingly, a phase difference signal 74 between the signals Pe and Pf in which the polarity was added to the output waveform of the polarity adding circuit 33 is presented as shown in FIG. 17N so that a negative polarity pulse 44 occurs in the portion where the inverted position is displaced. Further, the waveform 61 portion cannot express the phase difference between the signals Pe and Pf accurately.

The output of the buffer operational amplifier 51 obtained when the negative polarity pulse 44 and the error occurred in the waveform 61 portion are not compensated is considerably fluctuated as shown by a broken line 75 in FIG. 17N, which affects the inverted DC component remarkably.

According to the second embodiment of the present invention, since the phase difference detecting apparatus is arranged as shown in FIG. 18, the output of the operational amplifier 51 is held by a last pulse 77 in the waveform of the sample and hold pulse 76 shown in FIG. 17Q and which is obtained just before the track row direction is inverted, and is then output to the operational amplifier 53 as shown in FIG. 17S.

Therefore, according to the second embodiment of the present invention, the exclusive-OR circuit 50 generates the undecided portion 78 (see H portion in FIG. 17O) of the track moving direction. This output is then charged in the capacitor C1 in the filter 63 via the switch 55 so that the buffer operational amplifier 51 outputs the hold signal 78 (see FIG. 17R) of the last pulse 77.

During the period in which the undecided portion signal 78 of the track row moving direction shown in FIG. 17O is at high "H" level, the sample and hold pulse shown in FIG.

17Q is inhibited. That is, the last output of the buffer amplifier 53 is not changed during the period in which the switch 55 is closed.

A waveform fluctuation (shown by a broken line 75 in FIG. 17R) of the output of the filter 63 constructing the LPF can be prevented from being produced in the output of the operational amplifier 53. As a result, the operational amplifier 53 keeps producing the value of the last pulse 77.

When the pulse of the H interval shown in FIG. 17O is ended, the sampling pulse of the AND gate 59 is changed to the first pulse 79 shown in FIG. 17Q so that a pulse duty of the polarity adding circuit 33 is stabilized. Then, the low-pass filter 63 filters out the signal from the polarity adding circuit 33 by using the value of the last pulse 77 as an initial value. Consequently, the operational amplifier 53 generates a stable output having a phase difference between the signal Pe and Pf as shown in FIG. 17S.

Since the phase difference detecting apparatus is arranged and operated as described above, the advanced or delayed phase caused in the vicinity of a portion where the phase difference is zero due to the eccentricity based on the difference between the outer diameter of the spindle and the central aperture diameter of the optical disc when the optical disc is inserted at its central aperture into the spindle and rotated can be discriminated and the error produced when the phase difference is measured can be eliminated. Also, the error produced when the phase difference is measured under the condition that the track advancing direction is inverted can be held in advance and the error can be prevented from being produced in the measured output.

According to the phase difference detecting apparatus of the present invention, the influence of the measurement error produced when the track advancing direction is inverted can be eliminated and the phase difference can be measured accurately.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A phase difference detecting apparatus, comprising:
   (a) swinging direction discriminating means for discriminating on the basis of three beams obtained from a three-beam system optical head swinging directions in which tracks and said three beams are made perpendicular to one another;
   (b) advance phase and delay phase detecting means for detecting an advanced or delayed phase by a side beam detecting signal obtained from side beam photo-detecting means on the basis of two side beams of said three beams;
   (c) phase difference absolute value detecting means for detecting an absolute value of a phase difference on the basis of the detecting signal from said photo-detecting means;
   (d) a polarity adding circuit connected to an output side of said phase difference absolute value detecting means and being controlled on the basis of a judged signal of said advance phase and delay phase detecting means to determine a polarity of an absolute value detecting output signal; and
   sample and hold control signal generating means for generating a sample and hold control signal which discriminates a phase difference polarity between said two side beams on the basis of an output of said swinging direction discriminating means and an output of said advance phase and delay phase detecting means, and hold means responsive to the sample and hold control signal for holding a measurement error of a previous value of an error signal.

2. A phase difference detecting apparatus for detecting a phase relationship between first and second side beams of a plural beam optical disc system, said plural beam optical disc system having an optical head swingable substantially perpendicular to tracks of an optical disc, the first side beam, the second side beam, and a main beam being substantially perpendicular to the tracks of the optical disc, comprising:
   a first side beam receiving means for receiving a first side beam level comparison output, the first side beam level comparison output being a result of comparing a level of the first side beam to a level of a reference;
   a second side beam receiving means for receiving a second side beam level comparison output, the second level beam comparison output being a result of comparing a level of the second side beam to a level of a reference;
   a main beam receiving means for receiving a main beam level comparison output, the main beam level comparison output being a result of comparing a level of the second side beam to a level of a reference;
   a phase difference polarity detecting means for detecting a phase difference polarity of said first side beam relative to said second side beam responsive to said first side beam level comparison output, said second side beam level comparison output, and said main beam level comparison output, to produce a phase difference polarity output indicating one of a positive phase polarity and a negative phase polarity, wherein said phase difference polarity detecting means produces said phase difference polarity output at times error-free and at times error-laden;
   phase difference absolute value detecting means for detecting an absolute value of a phase difference between said first side beam and said second side beam responsive to said first side beam level comparison output and said second side beam level comparison output, to produce a phase difference absolute value output;
   polarity adding means for adding said phase difference polarity output to said phase difference absolute value output to produce a polarity added output, wherein said polarity adding means produces said polarity added output error-free when said phase difference polarity output is error-free and error-laden when said phase difference polarity output is error-laden;
   a sample and hold means for sampling said polarity added output at a time when said polarity adding means produces said polarity added output error-free, and holding said sampled error-free polarity added output while said polarity adding means produces said polarity added output error-laden.

3. A phase difference detecting apparatus as in claim 2, wherein said sample and hold means inhibits sampling of said polarity added output at a time when said polarity adding means produces said polarity added output error-laden.

4. A phase difference detecting apparatus as in claim 2, wherein said phase difference polarity detecting means comprises:

a first D-type flip flop having a data input for receiving said main beam level comparison output and having a clock input for receiving said first beam level comparison output, inverted, and sampling said value of said main beam level comparison output at rising edges of said first beam level comparison output, inverted, and providing said sample, inverted, as a first output signal;

a second D-type flip flop having a data input for receiving said second beam level comparison output, inverted, and having a clock input for receiving said first beam level comparison output, at its data input, and sampling said value of said second beam level comparison output, inverted, at rising edges of said first beam level comparison output, and providing said sample, inverted, as a second output signal; and an XOR device that receives said first output signal at a first input and receives said second output signal at a second input and producing said detected phase difference responsive to the XOR of said first output signal and said second output signal.

5. A phase difference detecting apparatus as in claim 2, wherein said phase difference absolute value detecting means is an XOR device that receives said first side beam comparison output at a first input and receives said second side beam comparison output, inverted, at a second input and produces said phase difference absolute value output responsive to the XOR of said first side beam comparison output and said second side beam comparison output, inverted.

6. A phase difference detecting apparatus as in claim 2, wherein said polarity adding means adds said phase difference polarity output to said phase difference absolute value output to produce said polarity added output.

7. A phase difference detecting apparatus as in claim 2, wherein said polarity adding means comprises a differential amplifier having an inverting input, a non-inverting input, and an output, said inverting input receiving said phase difference absolute value output through a first resistor and said output connected to said inverting input through a third resistor, said non-inverting input receiving said absolute value output through a second resistor; and a switch means for adding one of said positive phase polarity and said negative phase polarity responsive to said phase difference absolute value output responsive to said phase difference polarity output.

8. A phase difference detecting apparatus as in claim 2, further comprising a filter means between said polarity adding means and said holding means for filtering said polarity added output to provide a substantially smoothed DC component of said polarity added output to said holding means.

9. A phase difference detecting apparatus as in claim 2, further comprising:

a smoothing means for receiving said sampled error-free polarity added output and producing a smoothed error-free polarity added output.

10. A phase difference detecting apparatus as in claim 9, wherein said smoothing means is a low pass filter.

11. A phase difference detecting apparatus as in claim 9, further comprising:

a gain-adjustable amplifier for receiving said smoothed error-free polarity added output and producing an amplified smoothed error-free polarity added output.

\* \* \* \* \*